United States Patent [19]

Hasebe et al.

[11] Patent Number: 5,651,115

[45] Date of Patent: Jul. 22, 1997

[54] APPARATUS FOR SUPPLYING A LEADING-END SIGNAL FROM LEADING-END MEMORY MEANS THEREAFTER SUPPLYING THE CORRESPONDING INFORMATION SIGNAL FROM A STORAGE MEANS VIA A BUFFER MEANS

[75] Inventors: Atsushi Hasebe; Satoshi Yoneya; Satoshi Yutani; Yasumasa Kodama; Taro Shigata, all of Kanagawa, Japan

[73] Assignee: Sony Corporation, Tokyo, Japan

[21] Appl. No.: 364,948

[22] Filed: Dec. 28, 1994

[30] Foreign Application Priority Data

Dec. 28, 1993 [JP] Japan .................... 5-351424
Dec. 29, 1993 [JP] Japan .................... 5-353406
Dec. 29, 1993 [JP] Japan .................... 5-355371

[51] Int. Cl.⁶ .................................... G06F 13/00
[52] U.S. Cl. ............... 395/200.09; 395/872; 395/874; 395/445; 364/239.7
[58] Field of Search ................... 395/874, 880, 395/260.05; 364/939.7, 942.08, 919; 348/7; 455/5.1

[56] References Cited

U.S. PATENT DOCUMENTS

| | | | |
|---|---|---|---|
| 4,574,344 | 3/1986 | Harris et al. ................ | 395/500 |
| 4,812,972 | 3/1989 | Chastain et al. ............ | 395/375 |
| 5,014,125 | 5/1991 | Pocock et al. .............. | 358/86 |
| 5,414,455 | 5/1995 | Hooper et al. .............. | 348/7 |
| 5,418,713 | 5/1995 | Allen .......................... | 364/403 |
| 5,421,031 | 5/1995 | De Bey ....................... | 455/5.1 |
| 5,440,334 | 8/1995 | Walters et al. .............. | 348/6 |
| 5,442,389 | 8/1995 | Blahut et al. ............... | 348/7 |
| 5,473,362 | 12/1995 | Fitzgerald et al. .......... | 348/7 |

FOREIGN PATENT DOCUMENTS

| | | |
|---|---|---|
| 2071416-A | 12/1993 | Canada . |
| WO91/03112-A | 3/1991 | WIPO . |
| WO92/125999-A | 7/1992 | WIPO . |

OTHER PUBLICATIONS

Communications—Rising to the Heights, Denver, Jun. 23–26, 1991, vol. 2 of 3, Jun. 23 1991 Institute of Electrical and Electronics Engineers, pp. 842–846, XP 000269608 A. D. Gelman et al., A Store–and–Forward Architecture for Video–on–Demand Service.

*Primary Examiner*—Christopher B. Shin
*Assistant Examiner*—Anderson I. Chen
*Attorney, Agent, or Firm*—William S. Frommer; Alvin Sinderbrand

[57] ABSTRACT

An information signal transmission device in which information signals are transmitted to requesting parties responsive to requests made by plural requesting parties. The signals of the leading end of the information signals are pre-stored in a versing-up memory and, when a request is made by a requesting party, an output signal of a buffer memory unit for time axis expansion is transmitted to such requesting party after an output signal of the versing-up memory unit is transmitted to such requesting party.

15 Claims, 30 Drawing Sheets

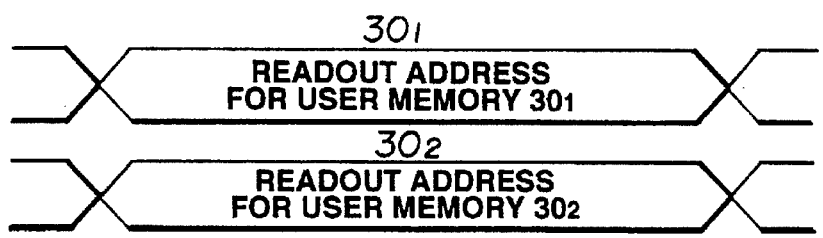
FIG.9A
FIG.9B
FIG.9C
FIG.9D

| ORDER OF REQUEST | REQUESTING PARTY | FILE REQUESTED | ADDRESS | NUMBER OF REMAINING BLOCK | INPUT/OUTPUT |
|---|---|---|---|---|---|
| 1 | REQUESTING PARTY H1 | TA | 25200 | 300 | OUT |
| 2 | REQUESTING PARTY H2 | TC | 24000 | 420 | OUT |
| 3 | REQUESTING PARTY H3 | TB | 21200 | 700 | OUT |
| 4 | REQUESTING PARTY H4 | TC | 19800 | 840 | OUT |
| 5 | REQUESTING PARTY H5 | TC | 18500 | 970 | OUT |
| 6 | REQUESTING PARTY H6 | TC | 10400 | 1780 | OUT |
| 7 | REQUESTING PARTY H7 | TB | 8600 | 1960 | OUT |
| 8 | REQUESTING PARTY H8 | TA | 100 | 2810 | OUT |

NEW USER H8 →

FIG.10

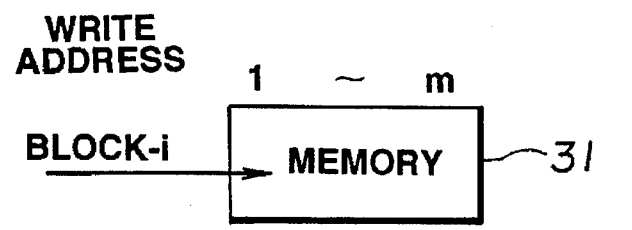
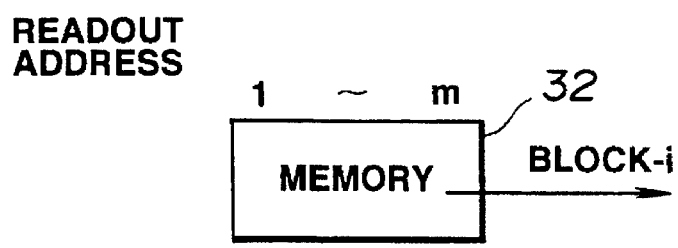
FIG.17A
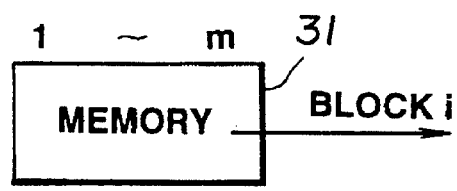
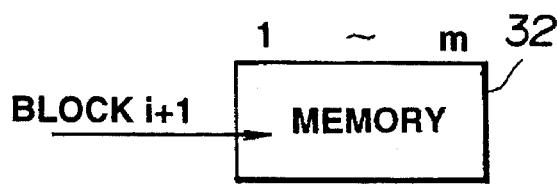
FIG.17B
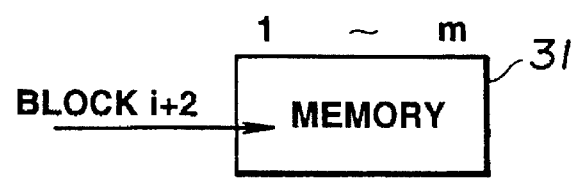
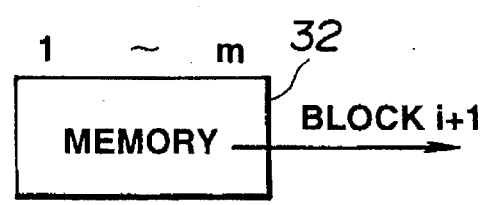
FIG.17C

APPARATUS FOR SUPPLYING A LEADING-END SIGNAL FROM LEADING-END MEMORY MEANS THEREAFTER SUPPLYING THE CORRESPONDING INFORMATION SIGNAL FROM A STORAGE MEANS VIA A BUFFER MEANS

BACKGROUND OF THE INVENTION

This invention relates to an information signal transmitting device responsive to plural information signal transmission requests for plural requesting parties for incidentally transmitting information signals. More particularly, it relates to an information signal transmitting device for transmitting the information signal from its leading end after lapse of a shorter waiting time since acceptance of a request for transmission of information signals.

For transmitting picture signals responsive to plural incidental picture signal transmission requests from plural requesting parties, it may be contemplated to lay in store dedicated reproducing units, such as video tape recorders $R_1, R_2, \ldots R_n$ for individual requesting parties $H_1, H_2, \ldots H_n$, as shown in FIG. 1, and to supply picture signals to monitoring devices $M_1, M_2, \ldots M_n$ of the individual requesting parties. If, with such method, the requesting party $H_1$ has requested to view a group or file $T_n$ of picture signals, referred to herein as a file, in place of a file $T_1$ the requester is currently viewing, it is necessary for the transmitter or the purveyor to exchange in a video tape recorder $R_1$ a video tape $V_1$ having the file $T_1$ recorded therein for a video tape $V_n$ having the file $T_n$ recorded therein. Consequently, some waiting time is produced since the requesting party $H_1$ has made a request until the desired pictures are actually purveyed.

On the other hand, if the requests by a requesting party $H_2$ and by another requesting party $H_n$ are directed to the same file, such as a file $T_2$, it is necessary for the purveyor to lay in store plural video tapes $V_2$ each having the file $T_2$ duplicated thereon.

Thus a system may be envisioned in which, instead of providing video tape recorders for individual requesting parties, a disc-shaped recording medium 100, having compressed pictures stored therein, as shown in FIG. 2, is laid in store for complying with the requests by the requesting parties for transmission of picture signals. The disc-shaped recording medium 1 has stored therein data of compressed pictures. The compressed picture data is read out from the recording medium 1 in time multiplexing. The compressed picture data read out in time multiplexing is expanded by a time axis expander 2 so as to be supplied to expanders $3_1$, $3_2, \ldots 3_n$ provided at the requesting parties $H_1, H_2, \ldots H_n$. The picture information expanded by the expanders $3_1, 3_2, \ldots 3_n$ is transmitted to the monitoring devices $M_1, M_2, \ldots M_n$.

Since the readout of the compressed picture data from the disc-shaped recording medium 1 is carried out time-divisionally, the picture data compressed on the time axis per unit time is sent out to plural requesting parties. The disc-shaped recording medium 1 may be read out while the picture information of plural files is random accessed per unit time.

If there are n requesting parties requesting transmission of pictures for an interval of t seconds, picture data for the time of nt may be read out by random accessing.

Thus, with a system employing the disc-shaped recording medium, the problem inherent in the above-mentioned system employing the video tape recorder may be resolved to some extent.

For example, the labor of exchanging the video tapes on request of file exchange may be dispensed with, while it becomes unnecessary to duplicate video tapes of the same file in readiness for a situation wherein plural requests are made for the same file.

Meanwhile, in the system employing the above-mentioned disc-shaped recording medium, the picture information cannot be purveyed instantaneously to the requesting parties, even although the operation of duplication, as required with the system employing the video tape recorder in case plural requests from different requesting parties are directed to the same file, is not required.

The reason is that, by reading out the pictures of each requested picture file by large blocks with a view to reducing the effects of access time losses of the disc-shaped recording medium, the sequence-waiting time for the requesting parties is protracted.

For reading out information data from the disc-shaped recording medium, the access time, which is the sum of the seek time necessary for the readout head to be moved as far as the information data storage position and the waiting time which elapses until stabilization of rotation of the disc-shaped recording medium, is required.

If the access time is rendered constant, and the data readout block size is changed, the data readout efficiency is changed as shown in FIG. 3. The data readout efficiency is inherently the efficiency based on the data transfer capacity per second. In FIG. 3, the access time is set to 0.045 second and the maximum readout speed is set to 30 Mbps. In FIG. 3, the readout block size is plotted on the abscissa. If the readout block size is 0.5 second, for example, the data readout efficiency is based on continuous data readout for 0.5 second.

In FIG. 3, if the readout block size is 0.5 second, the transfer efficiency plotted on the ordinate is 0.917 (91.7%). The reason is that, since the readout block size is only 0.5 second, the number of times of accessing needs to be increased despite the transfer capacity being inherently 30 Mbps. If the readout block size is 0.1 second, the transfer efficiency is lowered to 0.690 (69%).

If the maximum readout speed, the readout block size and the access time are set to R, B and Ta, respectively, the readout transfer efficiency RA is represented by $$RA = R \times (B/(B+Ta))$$

Consequently, the readout block size needs to be increased for improving the transfer efficiency.

However, if the readout block size is increased for raising the transfer efficiency, the sequence-waiting time is protracted when the requesting party has raised a request for a new file, so that the waiting time until the pictures of the file become available for the user is protracted, as a result of which the requesting party cannot view the pictures instantaneously.

OBJECTS AND SUMMARY OF THE INVENTION

It is a principal object of the present invention to provide an information transmitting device whereby information signals may be transmitted instantaneously to the requesting party from its leading end responsive to the request made by the requesting party.

It is another object of the present invention to provide an information transmitting device whereby information signals after change made therein may be transmitted instantaneously to the requesting party responsive to the request made by the requesting party.

It is yet another object of the present invention to provide an information transmitting device whereby information signals at a playback speed as requested by the requesting party may be transmitted to the requesting party responsive to the request made by the requesting party.

SUMMARY OF THE INVENTION

According to the present invention, there is provided an information signal transmission device for transmitting information signals to plural requesting parties responsive to requests made by the requesting parties. The information signal transmitting device comprises storage means having information signals stored therein, versing-up memory means for storing signals of leading ends of information signals stored in the storage means, and a plurality of buffer memory means for storing information signals for the requesting parties read out time-divisionally from the storage means on the block basis. The information signals when read out from the buffer memory means are expanded along the time axis. The information signal transmitting device further comprises changeover means fed with an output signal of the buffer memory means and an output signal of the versing-up memory means for transmitting the output signal of the buffer memory means to associated requesting parties after transmitting the output signal of the versing-up memory means to the associated requesting parties, and control means for controlling the storage means, buffer memory means and the versing-up memory means so that the information signals are transferred from the storage means to the buffer memory means responsive to requests from the requesting parties at the timing conforming to the requests made by the requesting parties and so that signals of the leading portions are outputted by the versing-up memory means at the timing conforming to the requests made by the requesting parties.

The control means controls the storage means and the buffer memory so that, when a change request is made by one of the plural requesting parties, a block associated with the change request is transferred from the storage means to the buffer memory for the requesting party making the change request immediately after the end of transfer of a block being transferred from the storage means to the buffer memory.

The storage means has plural disc recording/reproducing devices and the information signals are stored by being distributed among the disc reproducing devices at pre-set units. The storage means generate n-tuple speed information signals from signals reproduced from every (n–1) disc recording/reproducing devices when a request for n-tuple speed playback request is made by one of the plural requesting parties.

BRIEF DESCRIPTION OF THE DRAWINGS

FIGS. 9A to 9D are timing charts for illustrating the operation of the versing-up memory unit shown in FIG. 7.

FIG. 10 shows an illustrative input/output schedule table employed in the information signal transmission device shown in FIG. 4.

FIGS. 17A to 17C are diagrammatic views for illustrating the operation of the user memory unit shown in FIG. 6.

DETAILED DESCRIPTION OF THE PREFERRED EMBODIMENTS

Figure 1:
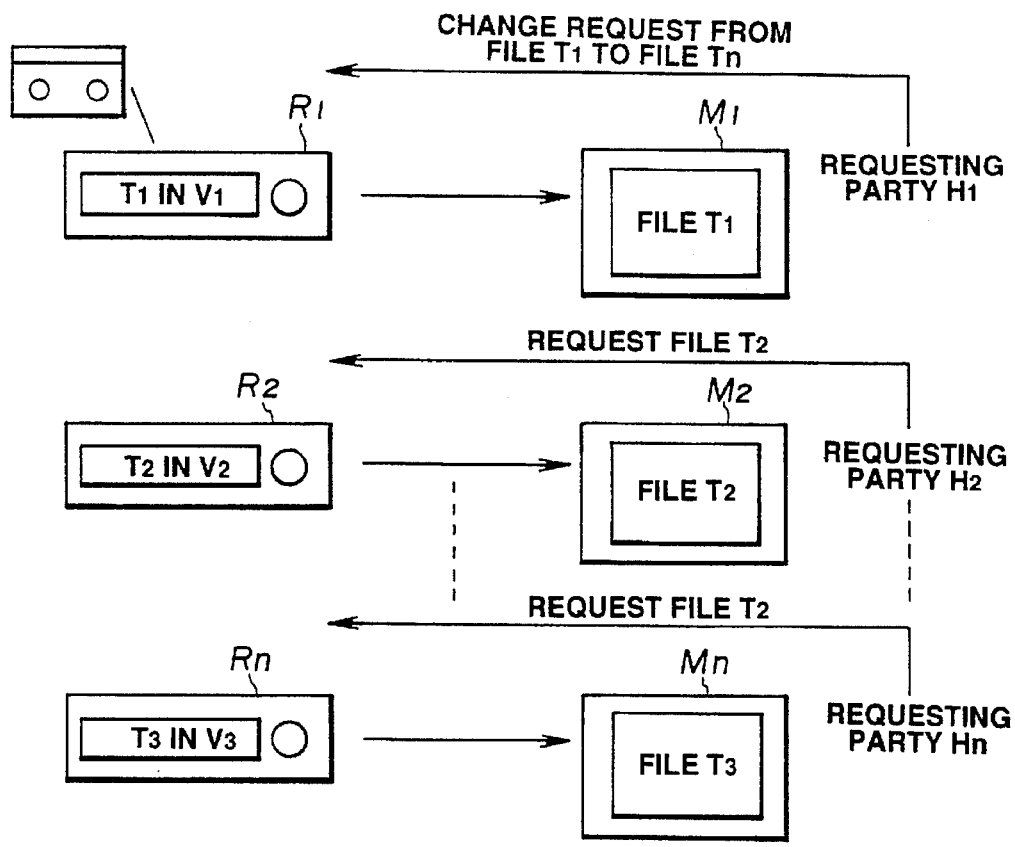
FIG. 1 is a diagrammatic view showing a picture transmission device employing a video disc player.
Figure 2:
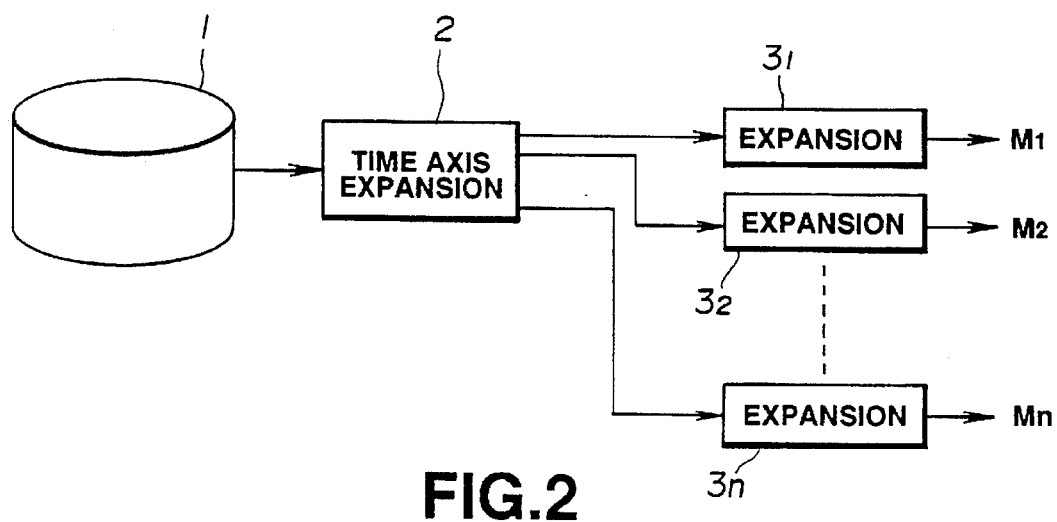
FIG. 2 is a block diagram showing a picture transmission device employing a disc reproducing device.

Referring to the drawings, preferred embodiments of the information transmission device according to the present invention will be explained in detail.

Figure 4:
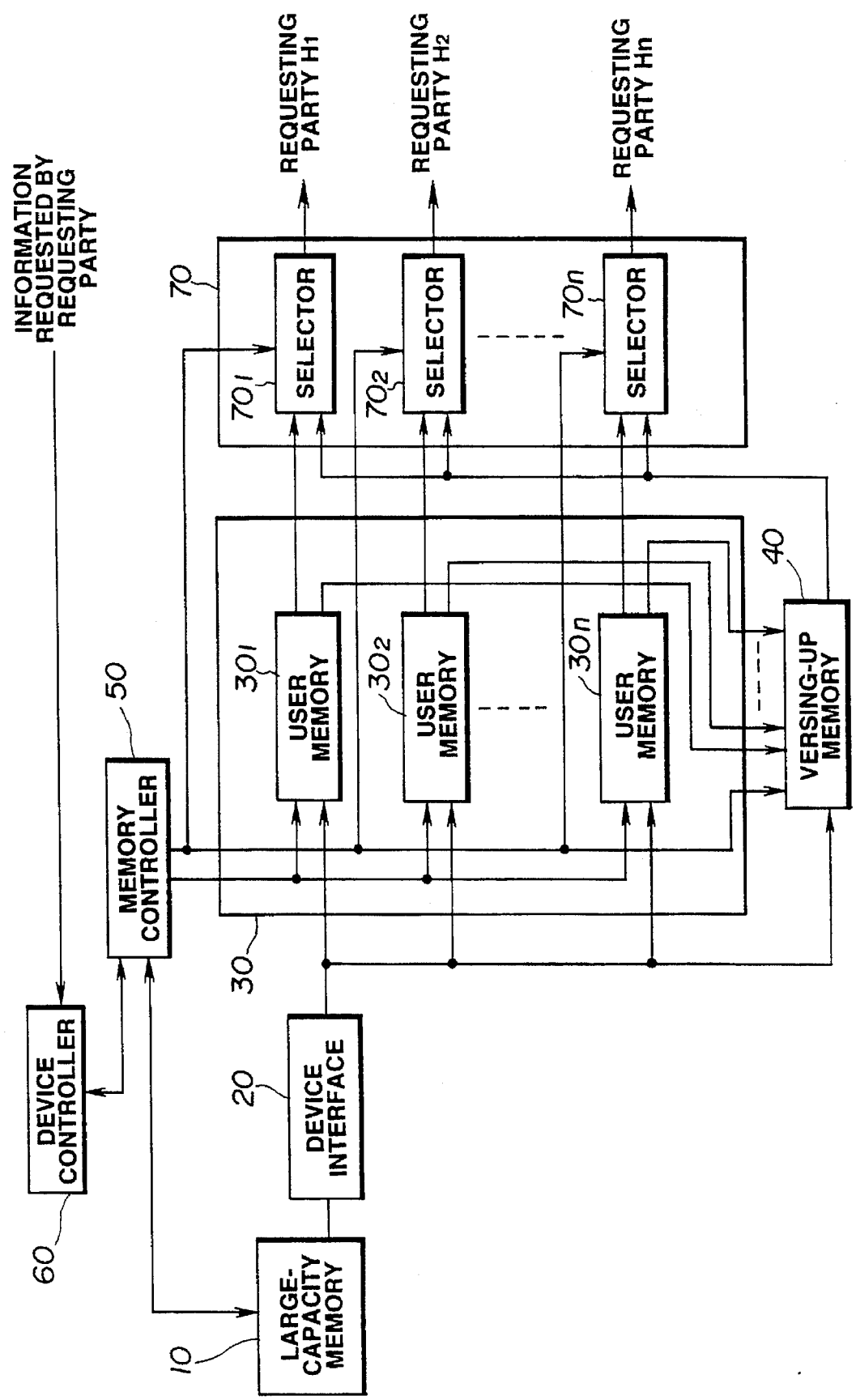
FIG. 4 is a block diagram showing an embodiment of the information transmission device according to the present invention.

The present embodiment is a picture signal transmission device for transmitting picture data responsive to independent separate picture information supply requests. Referring to FIG. 4, the video signal transmission device of the present embodiment includes a large-capacity memory unit 10 for storing picture signals of plural files, and a device interface 20 for performing format conversion and timing adjustment on picture signals of respective files read out from the large-capacity memory unit 10. The video signal transmission device also includes a user memory unit 30 having input/output means having an input/output buffer memory for data rate conversion for adjusting the input/output transfer rate for supplying picture signals of respective files supplied from the large-capacity memory unit 10 via the device interface 20, and a versing-up memory unit (leading-end locating memory unit) 40 for storing the information signals of the leading end of the file which are the information signals of the leading ends of the files supplied via the device interface 20. The video signal transmission device also includes a selection unit 70 for selective switching between the picture signals of the respective files outputted by the user memory unit 30 and the information signals of the leading ends of the files outputted from the versing-up memory unit 40 and supplying the selected signals to the requesting party. The video signal transmission device also includes a memory controller 50 for making data input/output control of the large-capacity memory unit 10, device interface 20, user memory unit 30 as input/output means and the versing-up memory unit 40 and causing data selection by the selection unit 70, and a device controller 60 for accepting the information requested by each requesting party and instructing the memory controller 50 to prepare and update an input/output schedule table as later explained.

Figure 5:
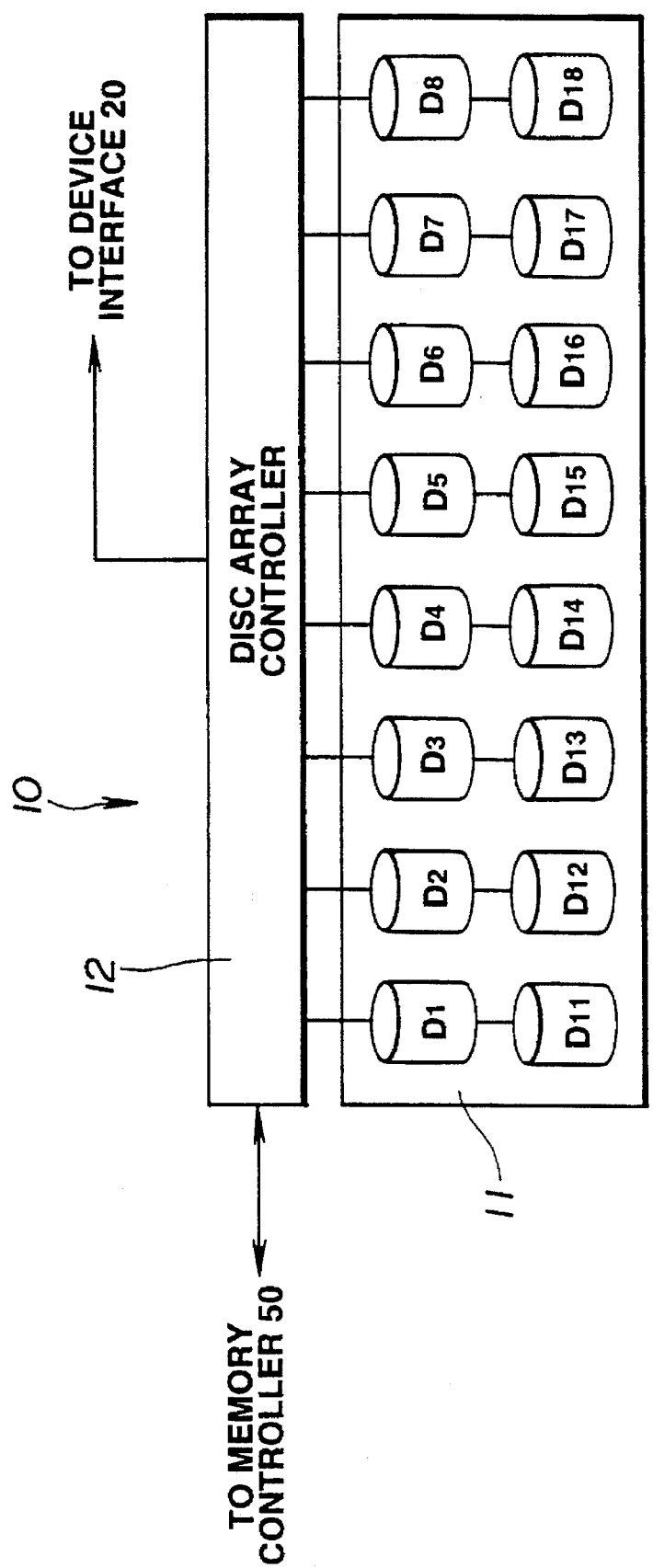
FIG. 5 is a block diagram showing an embodiment of a large-capacity memory unit in the information signal transmission device shown in FIG. 4.

The large-capacity memory unit 10 comprises a disc array 11 made up of two parallel rows of eight disc units $D_1$ to $D_8$ and eight disc units $D_{11}$ to $D_{18}$, and a disc array controller 12 for controlling the disc array 11, as shown in FIG. 5. The disc array 11 stores input picture data previously distributed and interleaved under control by the disc array controller. Thus the disc array 11 enables the storage capacity and the transfer rate to be improved to assure reliability higher than in a single disc device.

If there are plural input sets of picture signals, termed a file, such as a motion picture, the disc array 11 distributes the file pictures in the two rows each of eight disc drives. The disc array controller 12 is responsive to the command from the memory controller 50 to read out the file picture portions of the file pictures per unit time for delivery of the respective file pictures to the requesting parties.

The distributed picture signals of the respective file pictures, stored in the disc array 11, are picture data compressed in the data volume. Data compression may be made on the frame basis or on the on the basis of plural frames. If data compression is made on the frame basis, the total number of logic blocks as compression units is an integer number times the total number of the frames. If data compression is made on the basis of plural frames, the total number of logic blocks as compression units is an integer number times the total number of the basic unit for data compression, such as the total number of the group-of-pictures (GOPs).

The user memory unit 30 adjusts the input/output transfer rate, that is converts the data rate, for supplying the file picture supplied from the large-capacity memory unit 10 via the device interface 20. The picture data supplied from the disc array unit 11 via the device interface 20 has a high transfer rate since plural files are accessed per unit time. However, since the transfer rate of the picture data outputted to the requesting party is slow, the user memory unit 30 is required as input/output means for adjusting the transfer rate.

The user memory unit 30 has plural user memories $30_1$, $30_2$, ... $30_n$ equivalent in number to the requesting parties. The user memory $30_1$ is configured as shown for example in FIG. 6. That is, the user memory $30_1$ has memories 31, 32 of the double buffer configuration in which data can be outputted form one memory 31 or 32 while data is being written in the memory 32 or 31 and a user address controller 33 for controlling the input/output of the memories 31, 32 under the instructions of the memory controller 50 and for generating the write/read addresses. The picture signals of the file pictures supplied from the large-capacity memory unit 10 via the device interface 20 are inputted or outputted to or from the memories 31, 32 for adjusting the transfer rate by the user memory address generator 33 under the instructions issued by the memory controller 50. The picture signals outputted from the memories 31 or 32 are supplied to the selection unit 70.

The selection unit 70 has plural selectors $70_1$, $70_2$, ... $70_n$ corresponding in number to the requesting parties $H_1$, $H_2$, ... $H_n$, and outputs picture signal of the respective files from the user memory unit 30 or the information signals of the leading ends of the respective files from the versing-up memory unit 40 under control by the memory control unit 50. Of course, the information signals of the leading portions of the respective files are outputted for an interval of, for example, tens of seconds, after which the picture signals consecutive to the leading ends are outputted from the user memory unit The versing-up memory unit 40 has stored therein the information signals of the leading ends of the file picture via the device interface 20. The versing-up memory unit 40 is configured as shown for example in FIG. 7. The versing-up memory unit 40 comprises a versing-up memory 41 to which the information signals of the leading ends of the files from the large-capacity memory unit 10 via the device interface 20 are written and from which the information signals of the leading ends of the files are read out, and a versing-up memory address controller 42 for controlling the write/readout mode switching of the information signals of the leading ends of the files to and from the versing-up memory 41 and for generating the addresses.

The versing-up memory address controller 42 comprises an n-tuple sampling unit 43 for sampling the picture data readout addresses supplied from the user memory unit 30 using clocks having a period equal to n-tuple of the timing signals, and a write address generator 44 for generating a write addresses $AD_W$ for the information signal of the leading ends of the files under the command timing from the memory controller 50. The controller 42 also includes an address selector 43 for selecting one of the readout address $AD_R$ of the information signal of the leading ends of the files supplied from the n-tuple sampling unit 43 or the write address $AD_W$ supplied from the write address generator 44 and for transmitting the selected addresses to the versing-up memory 41.

Referring to FIGS. 8 and 9A to 9D, the n-tuple sampling operation, performed by the n-tuple sampling unit 43, is now explained.

The readout address of the picture data supplied from the user memory $30_1$ is added by an additive unit $47_1$ to the file versing-up address $AD_H$ from the memory controller 50 less unity, as obtained by an address processor $46_1$. An output signal of the additive unit $47_1$ is supplied to a sequential address data readout unit 48 where it is sequentially read so as to be sampled by clocks having a period equal to n times the period of the timing signal TM supplied from the memory controller 50. The signal thus read is supplied to the address selector 45 as readout address $AD_R$ of the information signals of the leading ends of the files. The readout addresses for the picture data supplied by the user memory $30_2$ are also added by an additive unit $47_2$ to the signal ($AD_H$–1) supplied from the address processor $40_2$ and the resulting sum signal is supplied to the sequential address data readout unit 48. The sum signal is sequentially read out by the readout unit 48 so as to be sampled by clocks having a period equal to n-times the period of the timing signal TM supplied by the memory controller 50 and so as to be supplied to the address selector 45 as the readout addresses $AD_R$ for the information signals of the leading file ends. The readout addresses for the picture data supplied from the user memory $30_m$ are processed in a similar manner.

In this manner, the readout addresses from the user memory $30_1$ shown in FIG. 9A, the readout address from the user memory $30_2$ shown in FIG. 9B and the readout addresses from the user memory $30_m$ shown in FIG. 9C are supplied to the versing-up memory address controller 42. If there is a requesting party for the information signals of the leading file ends from the versing-up memory 41, the corresponding readout address is summed to the address of the memory associated with the file less unity so as to be then sampled with the clocks having a period equal to n times of the timing signals to produce readout addresses $AD_R$ for the information signals for the leading file ends shown in FIG. 9D. The readout address signals $AD_R$ are supplied via the address selector 45 to the versing-up memory 41.

The versing-up memory 42 samples the readout addresses from the user memories $30_1$, $30_2$, ... $30_n$ by an n-tuple sampling unit 43, while nullifying the addresses from the user memory for which no request has been made under instructions of the memory controller 50.

The address selector 45 of the memory address controller 42 selects the write address $AD_W$ from the write address generator 44 under control by the memory controller 50 and routes the selected address to the versing-up memory 41, while writing the information signals of the leading file ends, that is the leading ends of the picture signals from the device interface 20.

The device controller 60 accepts the requests from the requesting parties, as discussed above, and instructs the memory controller 50 to formulate and update the input/output schedule table as shown in FIG. 10. The memory controller 50 controls data input/output of the large-capacity memory device 10, device interface 20, user memory unit 30 and the versing-up memory 40, while selecting data for the selection unit 70.

Figure 11:
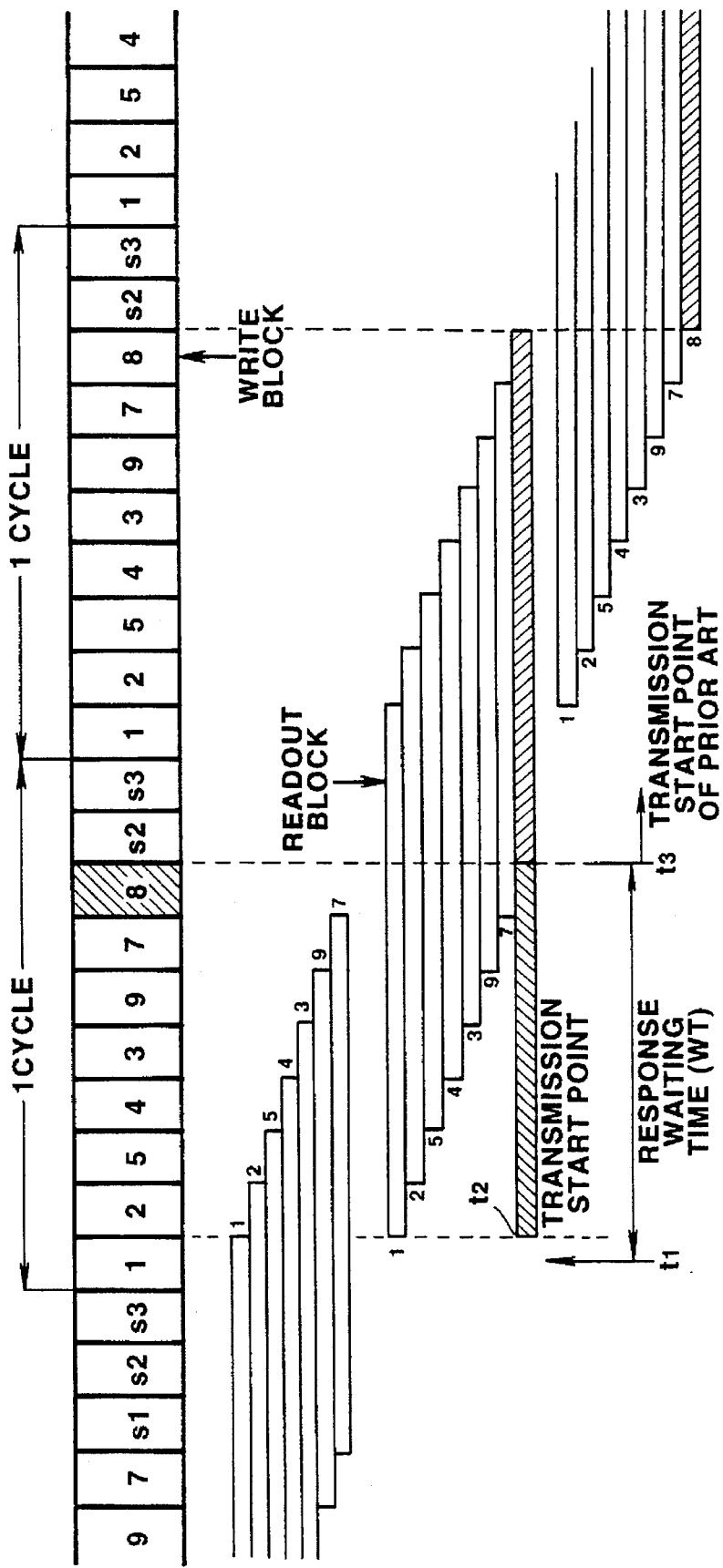
FIG. 11 is a diagrammatic view for illustrating the operation of the information signal transmission device shown in FIG. 4.
Figure 12:
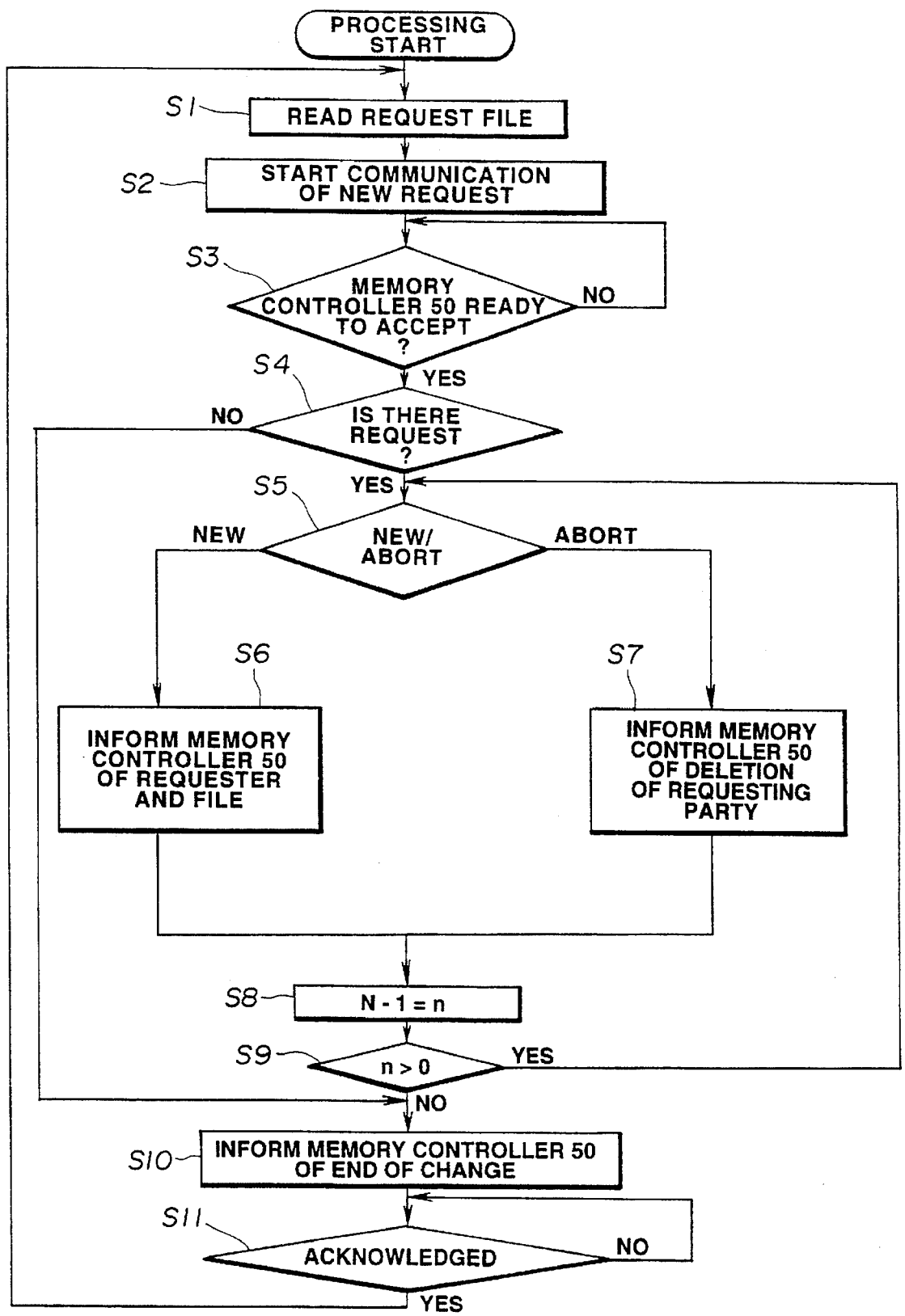
FIG. 12 is a flow chart for illustrating the operation of a device controller in the information signal transmission device shown in FIG. 4.
Figure 13:
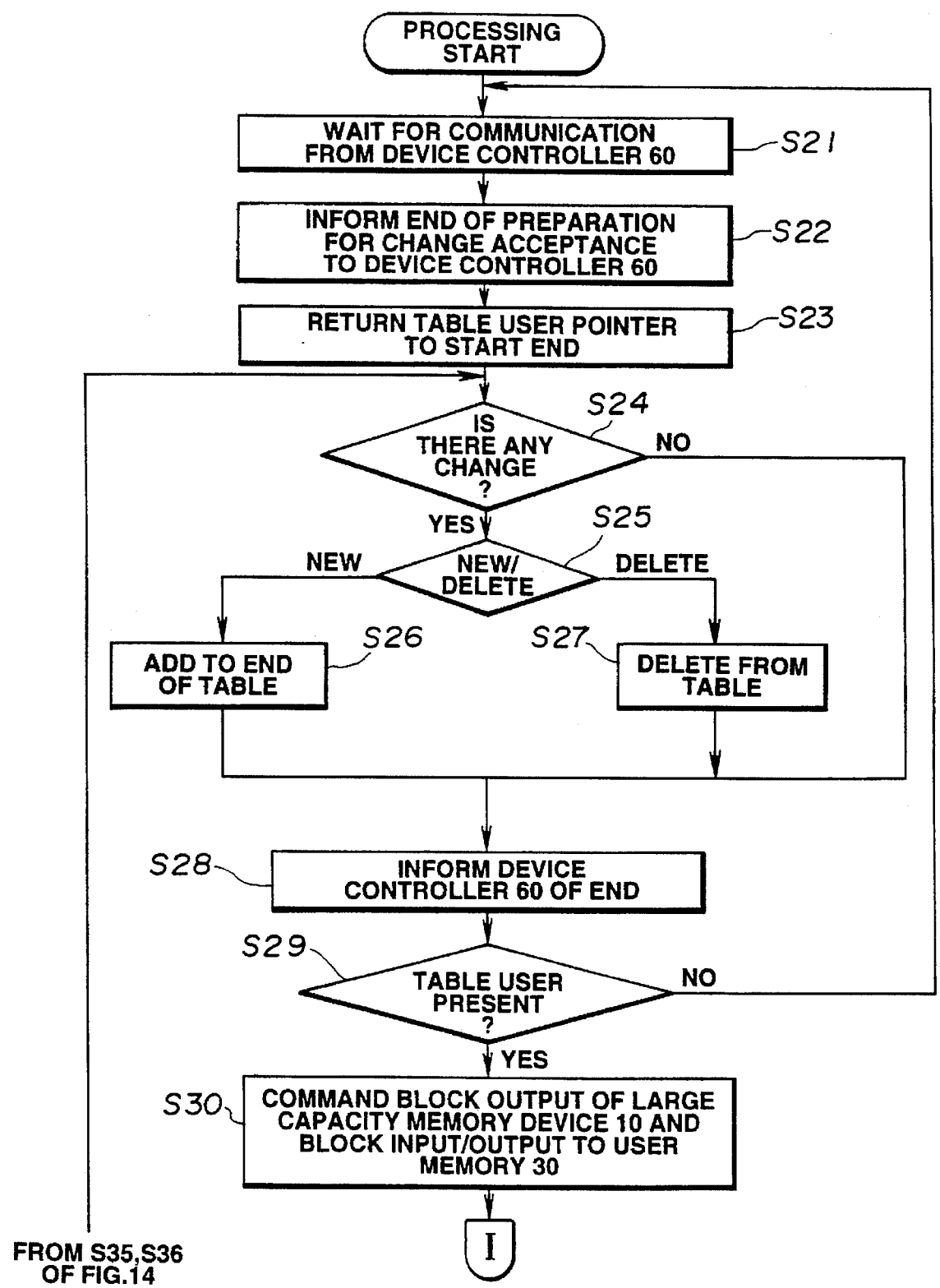
FIG. 13 is a flow chart for illustrating the operation of a memory controller in the information signal transmission device shown in FIG. 4.
Figure 14:
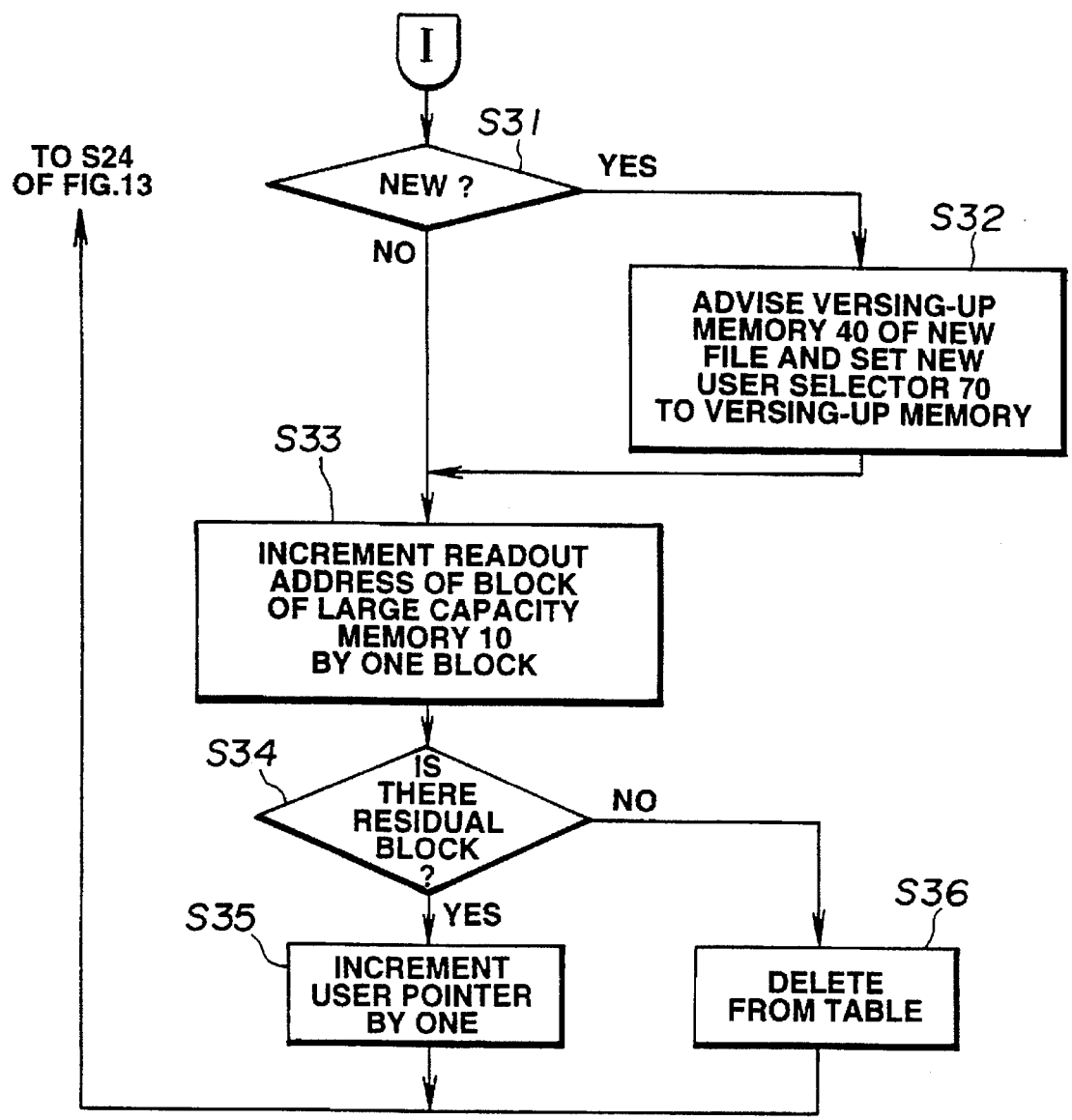
FIG. 14 is another flow chart for illustrating the operation of a memory controller in the information signal transmission device shown in FIG. 4.

Referring to FIGS. 11 to 14, the sequence of operations of the picture signal transmission device of the present embodiment, that is the control since the file request made by the requesting party until picture transmission, and the flow of picture data, is now explained. FIG. 11 illustrates the operation for the case in which the picture signal transmission device of the embodiment illustrated has responded to the request for transmission of a new picture by a requesting party $H_8$. FIG. 12 is a flow chart showing the control operation of the device controller 60 and FIGS. 13 and 14 are flow charts showing the operation of the memory controller 50.

If, with the conventional system, the requesting party $H_6$ has newly requested a file $T_A$ at a timing $t_1$ in FIG. 11, the file $T_A$ requested by the requesting party $H_8$ is transmitted at a timing $t_3$ after the end of a write block "8" positioned at back of a write block "7" for the requesting party $H_7$ within one cycle.

However, with the present embodiment, since the versing-up memory 40 previously stores the information signals of the leading file end of the file $T_A$, and starts transmitting the information signals of the leading file end at a timing $t_2$ when the write block "1" of the requesting party $H_1$ comes to a close, even when the file $T_A$ has been newly requested at the timing $t_1$, the picture requested can be promptly delivered to the requesting party $H_8$.

The device controller 60 first reads out a request list stating the requesting party and the requested file at step S1 in FIG. 12. At step S2, the device controller 60 starts the communication of the new request read at step S1.

The device controller 60 judges at step S3 whether or not the memory controller 50 is ready for acceptance. If the controller 60 judges that the memory controller 60 is ready for acceptance, the controller 60 proceeds to a step S4. If not, the controller 60 repeats the judgment in the step S3 until it is found that the memory controller 50 is ready for acceptance.

At step S4, the device controller 60 judges whether or not there is any new request, that is a request for change, in the request list read out at step S1. If the device controller 60 judges that there is any new request, it proceeds to step S5 and, if otherwise, it proceeds to step S10.

At step S5, the device controller 60 judges whether or not the request found to be a new request at step S4 is a new request or a request for abort. If the request is found to be a new request, the device controller 60 proceeds to step S6. If the request is found to be a request for abort, it proceeds to a step S7.

At step S6, the device controller 60 informs the memory controller 50 of the contents of the new request, that is the requesting party and the requested file. At step S7, the device controller 60 informs the memory controller 50 of the contents of the request for abort, that is deletion of the requesting party.

At steps S8 and S9, the device controller 60 judges whether or not there is made any other request. The device controller 60 judges whether or not the number n equal to the number N of the request list read at step S1 less unity is larger than zero in order to judge whether or not there is any other request. If n is found to be larger than zero, there is another request, so that the process from the step S5 is repeated. If n is found to be not larger than zero, there is no other request, so that the device controller 60 proceeds to step S10.

The device controller 60 informs the memory controller 50 of the end of the processing for change at step S10 responsive to the results of judgment at the steps S4 and S5, and advises the memory controller 50 at step S11 whether or not acknowledgement from the memory controller 50 has been given. If there is acknowledgement for end from the memory controller 50, the process from step S1 is repeated. The judgment as to the acknowledgement from step S11 is repeatedly made until acknowledgement for end is issued. The process from the step S1 is discontinued for the time being.

If the new request informed to the memory controller 50 by the above process by the device controller 60 is the information on the new request concerning the file $T_A$ from the requesting party $H_8$, the memory controller 50 adds the new request information to the input/output schedule shown in FIG. 10 by the process shown in FIGS. 13 and 14. The file $T_A$ is transmitted at the timing shown in FIG. 11 responsive to the request for viewing the picture of the file $T_A$ from the requesting party $H_8$.

At step S21 of FIG. 13, the memory controller 50 waits for the communication from the device controller 60. This process is equivalent to that of step S2 in FIG. 12. The memory controller 50 then informs the device controller 60 of the completion of preparation for acceptance of change at step S22. The memory 50 then resets at step S23 the user pointer of the input/output schedule table shown in FIG. 10 to a start end position.

The memory controller 50 judges whether or not there is any request for change from the device controller 60. If it is found that there is any change of the request, the memory controller 50 proceeds to step S25. If otherwise, the memory controller proceeds to step S28.

At step S25, the memory controller 50 judges whether the change of the request is a new request or the request for deletion. If the request is found to be a new request, the memory controller 50 adds the new request concerning the file $T_A$ of the requesting party $H_8$ at the last portion of the input/output schedule table as shown in FIG. 10. If the request has been found to be a request for abort, that is request for deletion, the memory controller 50 deletes the request corresponding to the request for deletion from the input/output schedule of FIG. 10.

When the process for steps S26 or 27 has come to a close, the memory controller 50 informs the device controller 60 of completion of table formulation. If there is no requesting party in the formulated table, the memory controller 50 repeats the process from the step S21.

At step S30, the memory controller 50 instructs the large-capacity memory unit 10 to output a block of the requested file based upon the input/output schedule table shown in FIG. 10. The memory controller 50 also instructs the user memory unit 30 to fetch the block outputted from the large-capacity memory unit 10 via the device interface 20.

The user memory address controller 33 writes the block consecutive to the information signals of the leading file end in the memory 31. When the memory 31 has become full, the writing is made in the memory 32 instead of in the memory 31. Thus the user memory address controller 33 changes over the write/read in or from the memories 31, 32 under the instructions issued from the memory controller 50. Such alternate writing/readout is carried out until there is no remaining block of the file picture. The user memories $30_1$, $30_2$, ... $30_n$ are dedicated to the requesting parties $H_1$, $H_2$, ... $H_n$.

When the writing in the memory 31 comes to a close and writing is changed over to the memory 32, readout is started from the memory 31. The writing of each unit block of each requesting party in the user memory unit 30 is terminated within one cycle time shown in FIG. 11. The respective unit blocks supplied time-divisionally from the large-capacity memory unit 10 to the user memory unit 30 are stored in the associated user memories $30_1, 30_2, \ldots 30_n$ for the requesting parties. The respective unit blocks shown in FIG. 11 are associated with the picture data for one cycle time of each requesting party. The unit blocks of the requesting parties are read out over each cycle time from the user memories $30_1, 30_2, \ldots 30_n$ dedicated to the requesting parties.

The block writing is carried out in the sequence of the requesting parties $H_1$, $H_2$, $H_5$, $H_4$, $H_3$, $H_9$, $H_7$ and $H_8$. The blocks s1, s2 and s3 are vacant blocks. Since the writing of the block concerning the file $T_A$ requested by the new requesting party $H_8$ is made last, the waiting time WT of from $t_1$ until $t_3$ is consumed, as described above, if the versing-up memory 40 is not employed.

Consequently, with the present embodiment, the information signals of the leading end of the file are transmitted from the versing-up memory unit 40, until the pictures are transmitted from the large-capacity memory unit 10, for shortening the waiting time WT. Referring to FIG. 11, transmission of the information signals of the leading file end from the versing-up memory 40 is started at a position of the initial write block "2" after the request made at $t_1$, and is continued for seven blocks. At a time point corresponding to the terminal end of the hatched block "8", picture data is switched to the picture data written in the memory 31. Consequently, the initial block supplied from the large-capacity memory unit 10 to the memory 31 is the block next to the leading end block of the file, instead of being the leading end block of the file, in consideration of the waiting time WT. In each sub-block, obtained on dividing the readout block of each requesting party by the allowable maximum number of the requesting parties, or 10 in the embodiment of FIG. 11, there are included plural frames or plural GOPs.

If there is made a new request, the memory controller 50 instructs the versing-up memory unit 40 to find the leading end of the requested file, at the same time as it instructs the selecting unit 70 to select the leading end information signals on the versing-up memory unit 40. The writing of all of the blocks of the information signals for the leading ends of the files in the versing-up memory unit 40 is made in advance. That is, when a new file is stored in the large-capacity memory unit 10, the memory controller 50 controls the large-capacity memory unit 10 and the versing-up memory 40 to write the block of the information signals for the leading file end in the versing-up memory 40 via the device interface 20. When the initial writing in the memory 31 from the large-capacity memory unit 10 comes to a close, and readout is started, the memory controller 50 sets the selection of the selection unit 70 to the side user memory controller 30.

Such operation becomes possible by adding the processing shown in FIG. 14 after the processing in the memory controller 50 shown at step S30 in FIG. 13.

That is, the memory controller 50 judges at step S31 whether or not the instruction issued at step S30 is the new request concerning the file $T_A$ of the requesting party $H_8$. If the instruction is the new request, the memory controller 50 proceeds to step S32 in order to inform the versing-up memory unit 40 of the new file, for example, the file $T_A$ of the requesting party $H_8$. The memory controller 50 then changes over the selector $70_8$ within the selection unit 70 for the requesting party $H_8$ to the side versing-up memory 40.

The memory controller 50 then increments at step S33 the readout address of the large-capacity memory unit 10 by one block. After coping with the request by the requesting party $H_8$, the memory controller checks at step S34 the possible presence of the residual block(s). If there is any residual block(s), the memory controller proceeds to step S35 to increment the user pointer by one. If there is no residual block, the memory controller proceeds to step S36 to delete the change request from the table.

After the processing of steps S35 or S36 come to a close, the memory controller returns to step S24 of FIG. 13.

The cycle time of FIG. 11 is now explained.

Figure 3:
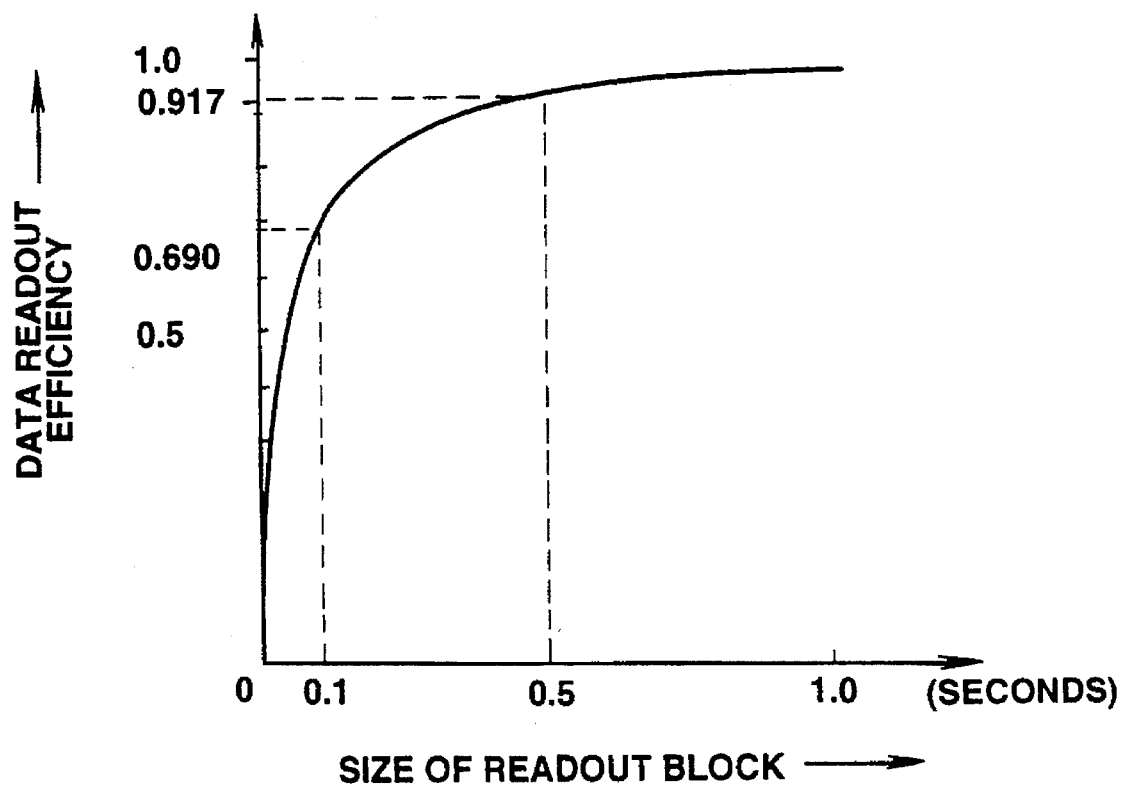
FIG. 3 is a graph showing the relation between the data readout efficiency and the readout block size in the picture transmission device shown in FIG. 2.

As the large-capacity memory unit 10, a disc array composed of two parallel-connected rows of eight magneto-optical discs, each having a maximum transfer rate of 30 Mbps and the access time of 0.045 second, are employed. The transfer rate to the requesting party is 4 Mbps. If the block length per requesting party is set to 0.917 for the efficiency of 0.917 (readout rate of 27.5 Mbps) in FIG. 3, it is seen from 27.5 Mbps×8/4 Mbps (=55) that up to a maximum number of 55 requesting parties can be supported in the present embodiment. If the versing-up memory unit 40 is not employed, the waiting time for up to 55 requesting parties is 27.5 seconds (=0.5 second×55), such that, in the worst case, the waiting time of 27.5 seconds is produced until the new requesting party views the pictures. It is not more than 0.5 second in the present embodiment.

If the block length per requesting party is 0.1 second, the efficiency is 0.690, such that up to 41 requesting parties can be supported. If, in this case, the versing-up memory unit 40 is not employed, the waiting time is 4.1 seconds, while it is not more than 0.1 second in the present embodiment.

Figure 15:
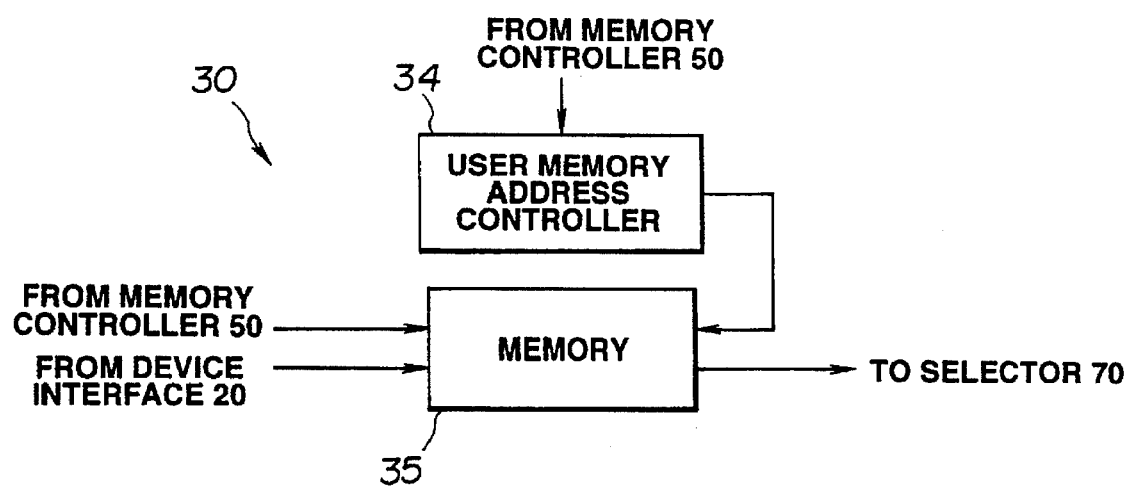
FIG. 15 is a block diagram showing another embodiment of a user memory unit in the information signal transmission device shown in FIG. 4.

The user memory unit 30 in the picture signal transmission device of the embodiment illustrated may be configured as shown in FIG. 15.

Figure 6:
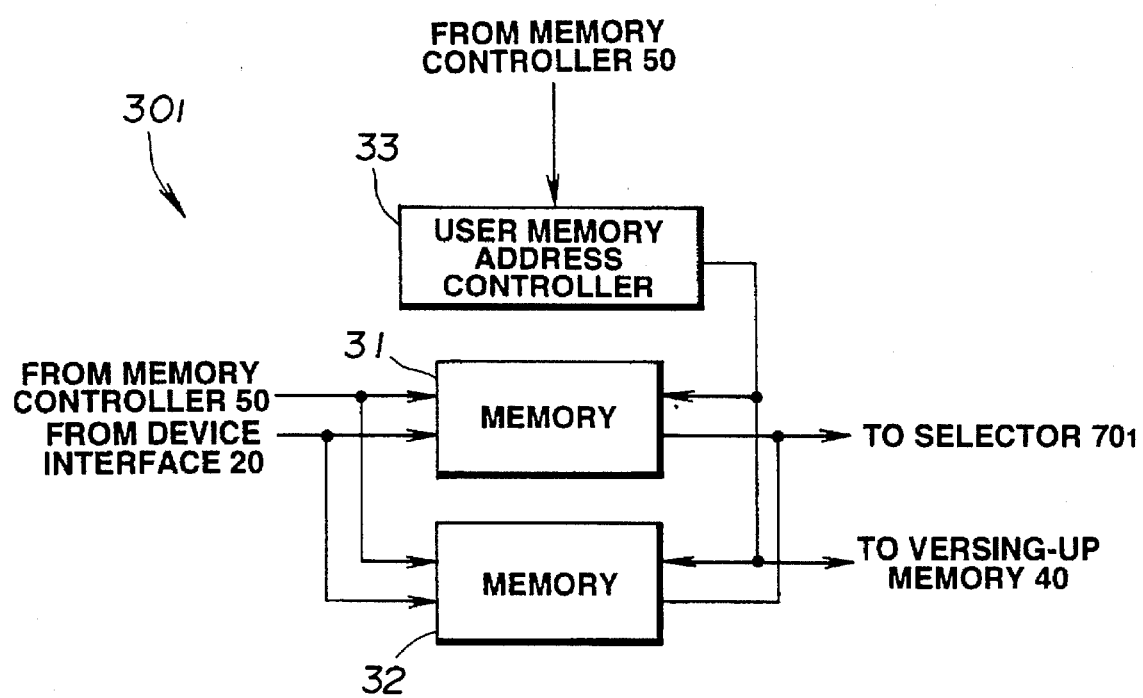
FIG. 6 is a block diagram showing an embodiment of a user memory unit in the information signal transmission device shown in FIG. 4.
Figure 16A:
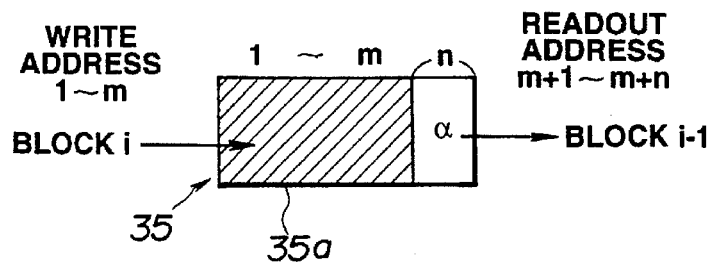
FIGS. 16A to 16C are diagrammatic views for illustrating the operation of the user memory unit shown in FIG. 15.
Figure 16B:
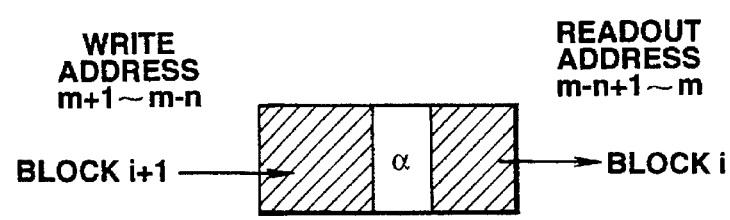
Figure 16C:
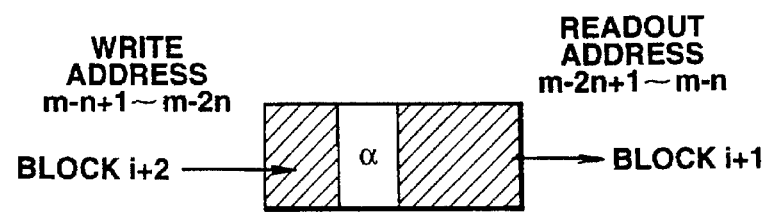

The user memory unit 30 is made up of a user memory address controller 34 and a memory 35. As shown in detail in FIGS. 16A to 16C, the memory 35 is made up of a write area 35a, shown shaded, and an area α for preventing data in the readout area from being lost. This area α is approximately equal to the write area 35a/the maximum number of the requesting parties. The operation of the user memory unit 30 shown in FIG. 6 is shown for reference sake in FIGS. 17A to 17C.

The information signal transmission device according to the present invention is not limited to the above-described embodiment. For example, if there are too many requesting parties, that is, if the number of requesting parties is five times the number n of the embodiment shown in FIG. 4, or 5n, the picture signal transmitting device shown in FIG. 18 may be employed. The parts or components which are the same as those of the picture signal transmitting device shown in FIG. 4 are denoted by the same reference numbers and the corresponding description is omitted.

Figure 18:
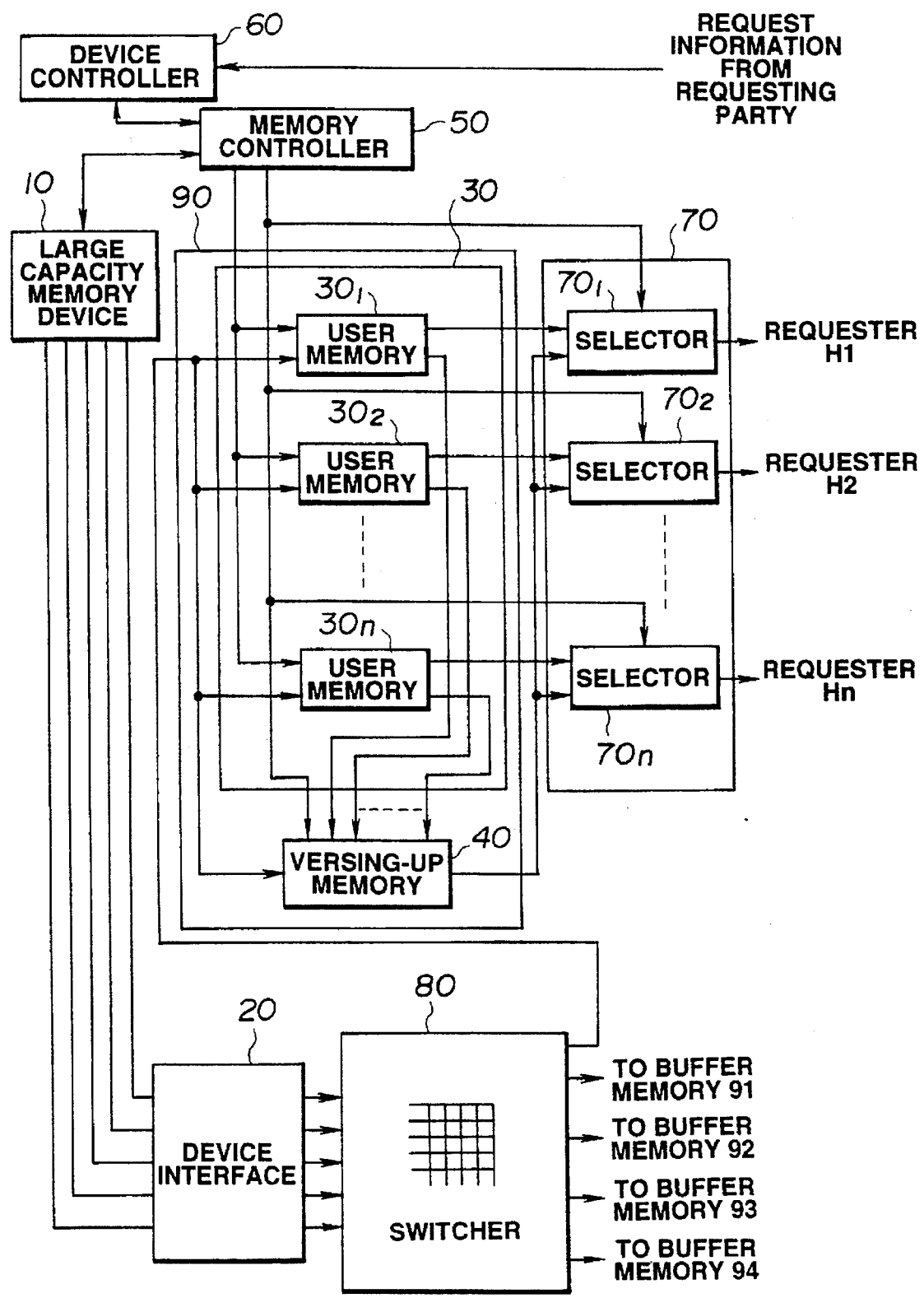
FIG. 18 is a block diagram showing another embodiment of the information transmission device according to the present invention.

The picture signal transmitting device shown in FIG. 18 differs from the device shown in FIG. 4 in that a number of the user memory units 30 as input/output means each having an input/output buffer memory corresponding to the number 5n of the plural users, in that five of the versing-up memory units 40 are provided, and in that a switcher 80 is provided between the large-capacity memory unit 10 and the user memory units 30 for interconnecting a buffer memory unit 90 made up of the user memory unit 30 and the versing-up memory unit 40, other buffer memory units 91, 92, 93 and 94, each corresponding to the buffer memory 90, and an interface device 20.

That is, the picture signal transmitting device shown in FIG. 18 comprises, besides the above-mentioned large-capacity memory unit 10, the user memory unit 30 having input/output buffer memories for inputting or outputting the information signals stored in the large-capacity memory unit 10, plural versing-up memory units 40 for storing the leading ends of the information signals of the respective files stored in the large-capacity memory unit 10 and the switcher 80 for distributing the information signals of the respective files from the large-capacity memory unit 10 among the buffer memory units 90, 91, 92, 93 and 94 each made up of plural user memory units and plural versing-up memory units, a memory control unit 50 for controlling the transmission of the information signals of the leading ends of the respective files from the versing-up memory units 40 and the information signals of the respective files from the user memory units 30. The switcher 80 distributes the information signals to the buffer memory 90 so that the picture signals consecutive to the information signals of the leading file end will be read out from the user memory units each having plural user memory units in continuation from the information signals of the leading file end read out from the versing-up memory units 40. Thus it is possible for the picture signal transmission device shown in FIG. 18 to increase the device scale for complying with an increased number of the requesting parties.

Figure 19:
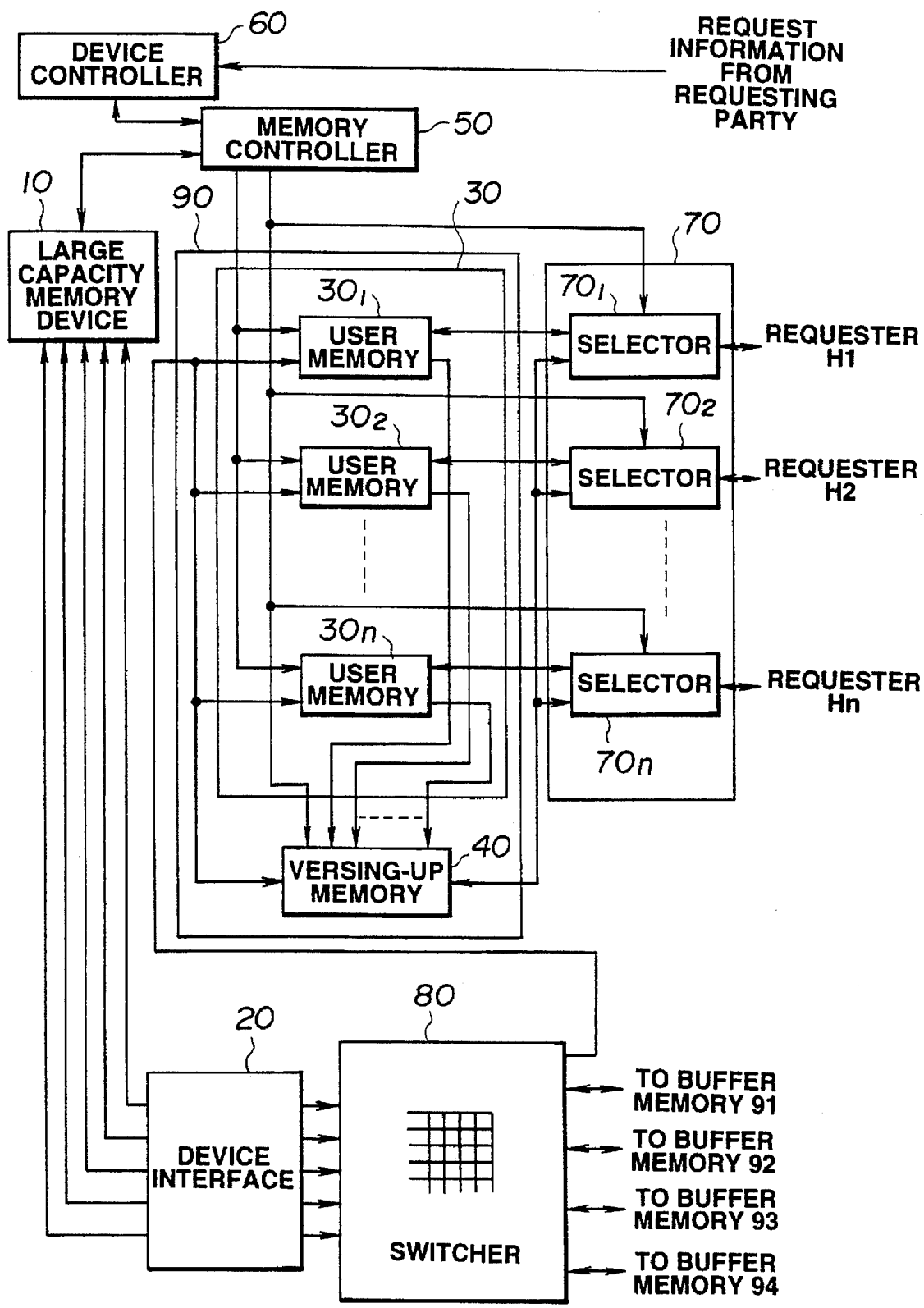
FIG. 19 is a block diagram showing a still another embodiment of the information transmission device according to the present invention.

The information signal transmitting device according to the present invention may be configured as shown in FIG. 19. The parts and components which are the same as those of FIG. 4 are denoted by the same numerals and the corresponding description is omitted.

That is, the picture signal transmitting device shown in FIG. 19 comprises the above-mentioned large-capacity memory unit 10 and the user memory unit 30 having input/output buffer memories for inputting or outputting the information signals stored in the large-capacity memory unit 10. The device also includes plural versing-up memory units 40 for storing the leading ends of the information signals of the respective files stored in the large-capacity memory unit 10 and the switcher 80 for distributing the information signals of the information signals of the respective files from the large-capacity memory unit 10 among the buffer memory units 90, 91, 92, 93 and 94 each made up of plural user memory units 30 and plural versing-up memory units 40. The device also includes a memory control unit 50 for controlling the transmission of the information signals of the leading ends of the respective files from the versing-up memory units 40 and the information signals of the respective files from the user memory unit 30. The switcher 80 distributes picture signals to the buffer memory 90, while distributing the picture signals from the buffer memory 90 to the large-capacity memory unit 10, in such a manner that the picture signals consecutive to the information signals of the leading file end will be read from the user memory unit 30 each having plural user memories next to the information signals of the leading end of the file previously read out from the versing-up memory unit 40 by the memory control unit 50. Consequently, it is possible for the picture transmission device shown in FIG. 19 not only to transmit picture signals but also to receive the pictures responsive to requests placed by the requesting parties.

The information signals employed in the information signal transmitting device according to the present invention may be audio signals or letter information signals in place of picture signals.

The information signal transmission device comprises a large-capacity memory unit, input/output means having an input/output buffer memory for inputting or outputting information signals stored by the large-capacity memory unit, versing-up memory means for storing the leading ends of the information signals of the respective files stored by the large-capacity memory unit, and control means for controlling the transmission of the information signals of all of the leading ends of the respective files from the readout memory means and the information signals of the respective files from the input/output means. The control means transmit the information signals of the leading ends of the respective files from the versing-up memory means and the information signals of the respective files from the input/output means in a commuted manner, so that the pictures can be instantaneously transmitted responsive to the new picture request by the requesting parties without obstructing picture transmission to other plural requesting parties without being affected by the access time loss.

The information signal transmission device also comprises a large-capacity memory unit, plural input/output means associated with pre-set plural users and having an input/output buffer memory for inputting or outputting information signals stored by the large-capacity memory unit, plural versing-up memory means for storing the leading ends of the information signals of the respective files stored by the large-capacity memory unit, switcher means for distributing the information signals of the respective files from the large-capacity memory unit to buffer memory means made up of the plural versing-up memory means and the plural input/output means, and control means for controlling transmission of the information signal of the respective files from the above versing-up memory means and the information signals of the respective files from the input/output means. The switcher 80 distributes picture signals to the buffer memory in such a manner that the picture signals consecutive to the information signals of the leading ends of the respective files will be read from the input/output means each having plural user memories next to the information signals of the leading end of the file previously read out from the versing-up memory unit 40 by the control means. Thus the pictures can be instantaneously transmitted responsive to the new picture request by the requesting parties without obstructing picture transmission to other plural requesting parties without being affected by the access time loss. Thus it is possible to increase the device scale for complying with an increased number of the requesting parties.

The information signal transmission device also comprises a large-capacity memory unit, input/output means associated with pre-set plural users and having an input/output buffer memory for inputting or outputting information signals stored by the large-capacity memory unit, versing-up memory means for storing the leading ends of the information signals of the respective files stored by the large-capacity memory unit, switcher means for distributing the information signals of the respective files from the large-capacity memory unit to buffer memory means made up of the plural versing-up memory means and the plural input/output means and control means for controlling transmission of the information signal of the respective files from the above versing-up memory means and the information signals of the respective files from the input/output means. The switcher distributes picture signals to the buffer memory, while distributing the picture signals from the buffer memory to the large-capacity memory unit, in such a manner that the picture signals consecutive to the information signals of the leading ends of the respective files will be read from the input/output means each having plural user memories next to the information signals of the leading ends of the respective files previously read out from the versing-up memory unit 40 by the control means. Thus the pictures can be instantaneously transmitted responsive to the new picture request by the requesting parties without obstructing picture transmission to other plural requesting parties without being affected by the access time loss. It is possible not only to transmit information signals but also to receive information signals responsive to the requests by the requesting parties.

Figure 7:
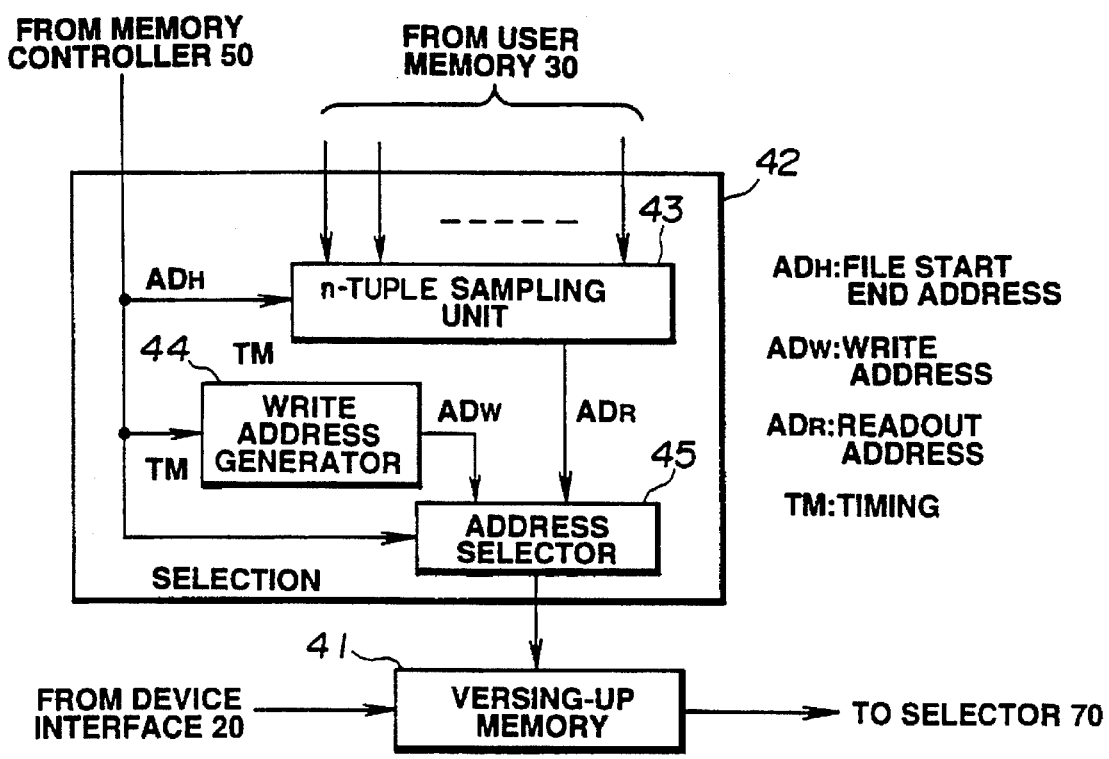
FIG. 7 is a block diagram showing an embodiment of a versing-up memory unit in the information signal transmission device shown in FIG. 4.
Figure 8:
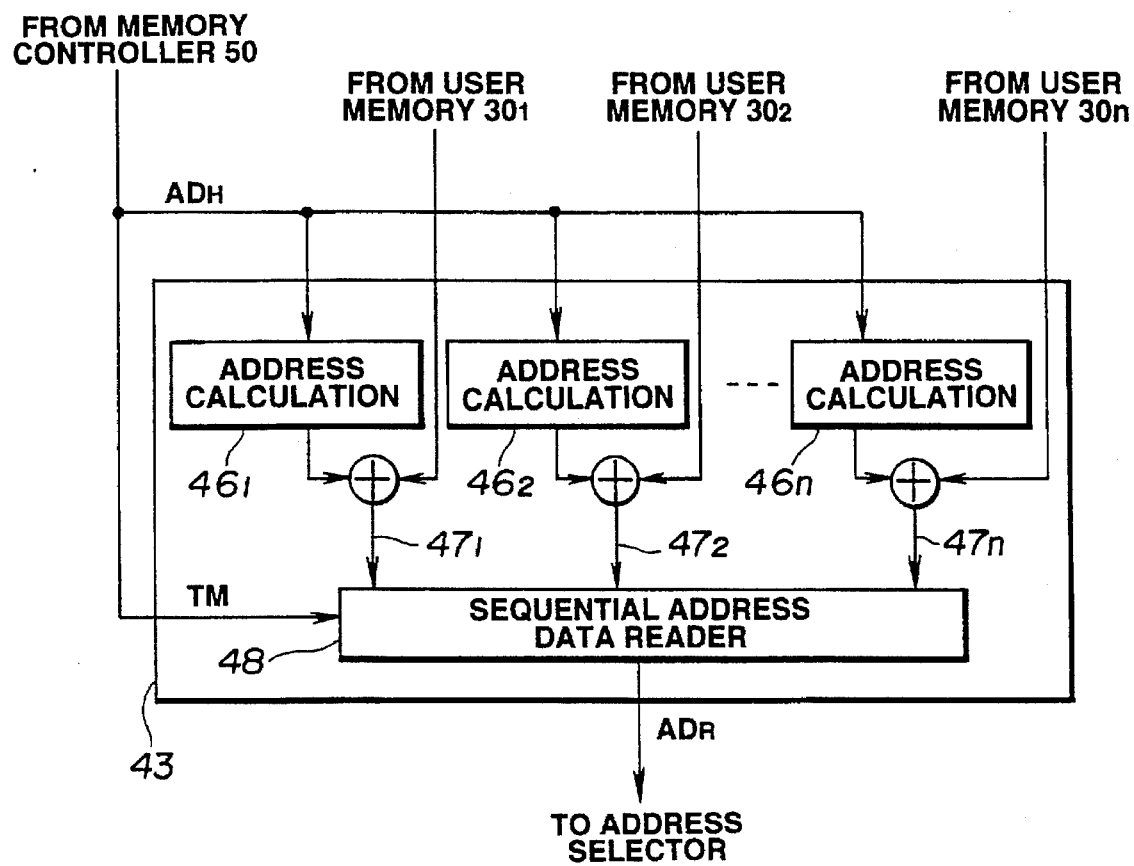
FIG. 8 is a block diagram showing an embodiment of a n-tuple sampling portion of the versing-up memory unit in the information signal transmission device shown in FIG. 4.
Figure 20:
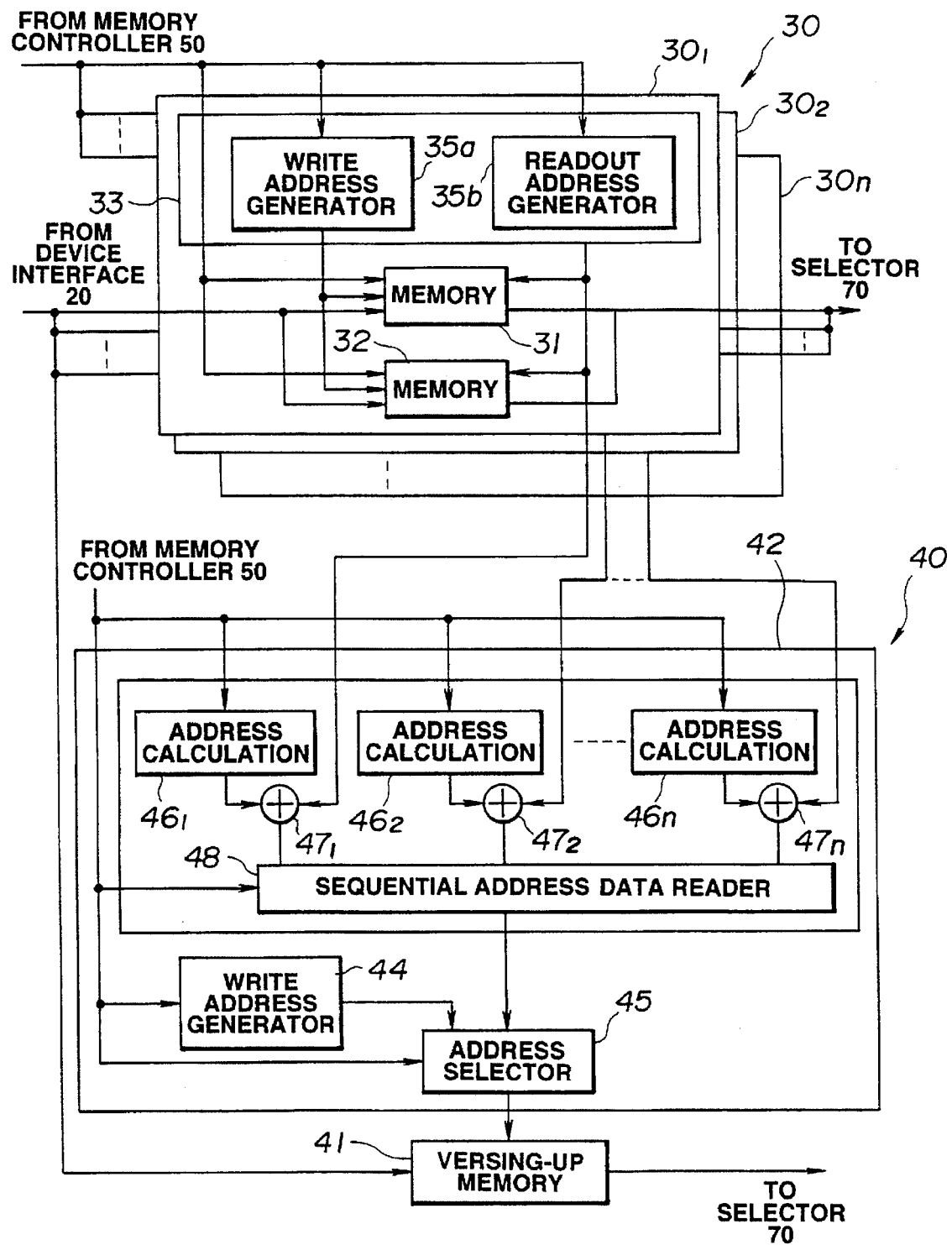
FIG. 20 is a block diagram showing an embodiment of a user memory unit and a versing-up memory unit of the information signal transmission device shown in FIG. 4.

Referring to FIG. 20, the arrangement of the user memory unit 30 and the versing-up memory unit 40 is now explained. The parts or components which are the same as those shown in FIGS. 7 and 8 are denoted by the same reference numerals and the corresponding description is omitted.

In FIG. 20, the user memory $30_1$ in the user memory unit 30 is made up of memories 31, 32 and a user memory address controller 33. The user memory address controller 33 includes a write address generator 35a and a readout address generator 35b and generates two types of addresses, that is write addresses and readout addresses for the memories 31, 32.

The write addresses are supplied to the memory 31 or to the memory 32 under control from the memory control unit 50. The readout addresses are supplied to the memory 32 or to the memory 31 under control from the memory controller 50. The write addresses are changed over to the readout addresses or vice versa at each junction point of neighboring cycles. The readout addresses are usually the same addresses for the user memories $30_1$ to $30_n$. However, if a request is made for changing the position of picture transmission by a requesting party, the user memory address controller for the requesting party generates different addresses independently of the other user memory address controllers. Thus it is necessary for respective user memory address controllers to generate different readout addresses.

As described previously, the information signals of the leading file ends as the leading portions of the file picture from the device interface 20 are stored in the versing-up memory unit 40. The versing-up memory unit 40 is made up of a versing-up memory 41 in and from which the information signals of the leading file end via the device interface 20 are written and read out and a versing-up memory address controller 42 for generating the addresses and for controlling the write/read of the information signals of the leading file ends to and from the versing-up memory 41.

The versing-up memory controller 42 comprises a n-tuple sampling unit 43 for sampling the picture data readout addresses supplied from the user memory unit 30 using clocks having a period equal to n times that of the timing signals, a write address generator 44 for generating the write addresses for the information signals of the leading file end at a timing commanded by the memory controller 50, and an address selection unit 45 for selecting the readout address for the information signals of the leading file end supplied from the n-tuple sampling unit 43 and the write address supplied from the write address generator 44 under the instructions from the memory controller 50 and for supplying the selected address to the versing-up memory 41.

The n-tuple sampling performed by the n-tuple sampling unit 43 is the same as that described above and hence is not explained herein.

The sequence of operations of the picture signal transmission device of the present embodiment, that is the control operations since the request for change of the position of transmission until transmission of the changed picture, as well as the flow of the picture data, will be explained by referring to FIGS. 21 to 24.

Figure 21:
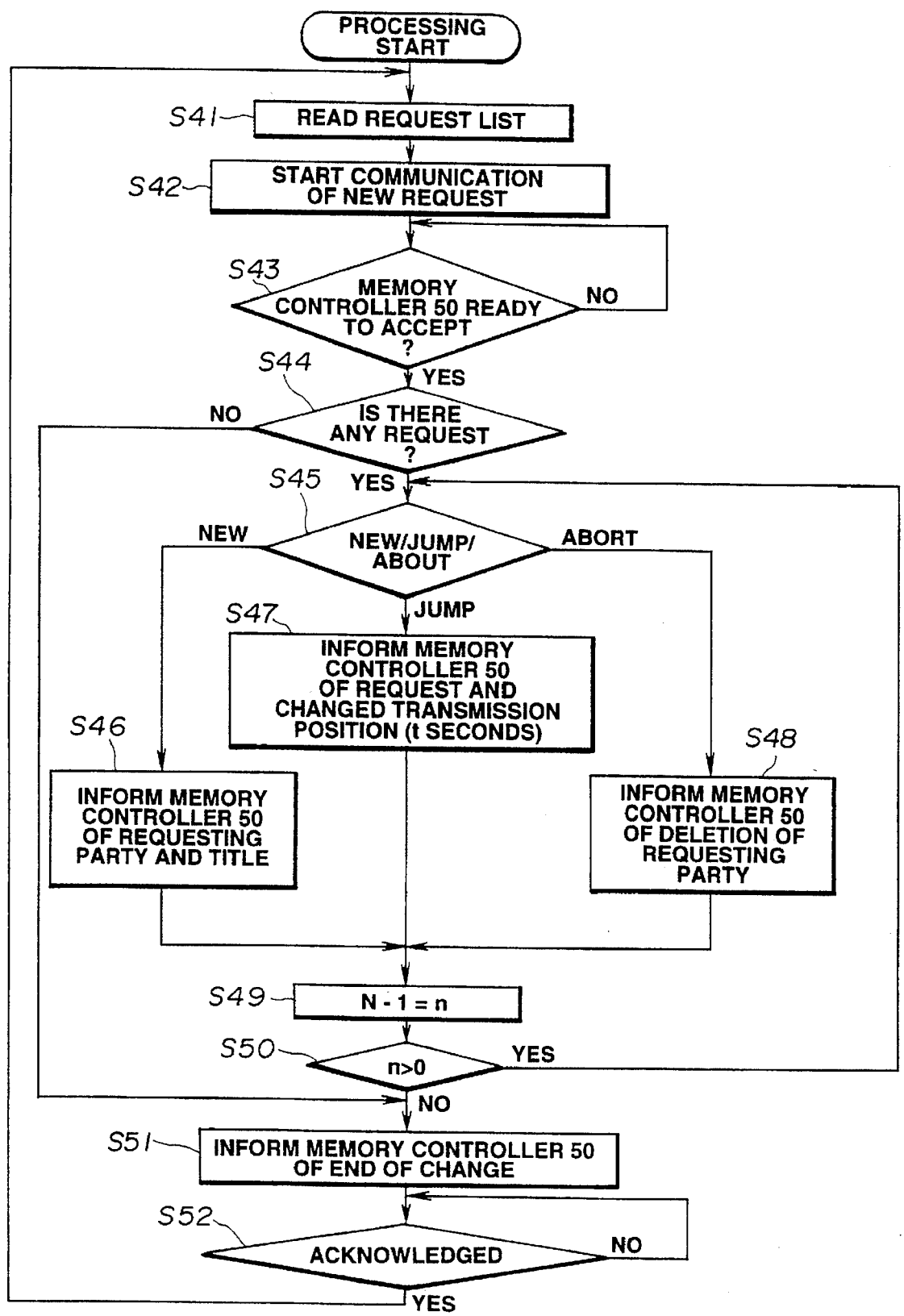
FIG. 21 is a flow chart for illustrating the operation of a device controller in the information signal transmission device shown in FIG. 4.
Figure 22:
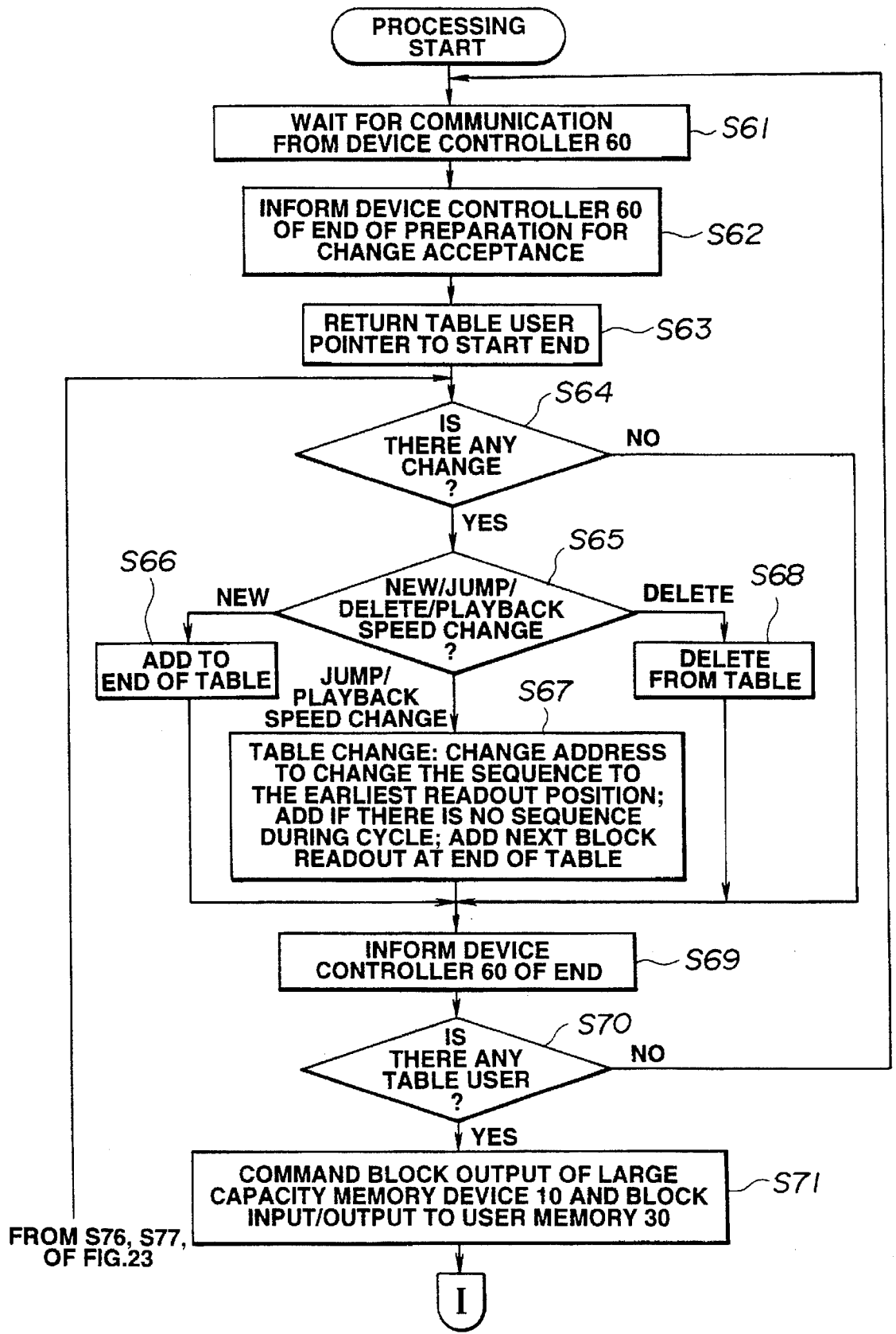
FIG. 22 is a flow chart for illustrating the operation of a memory controller in the information signal transmission device shown in FIG. 4.
Figure 23:
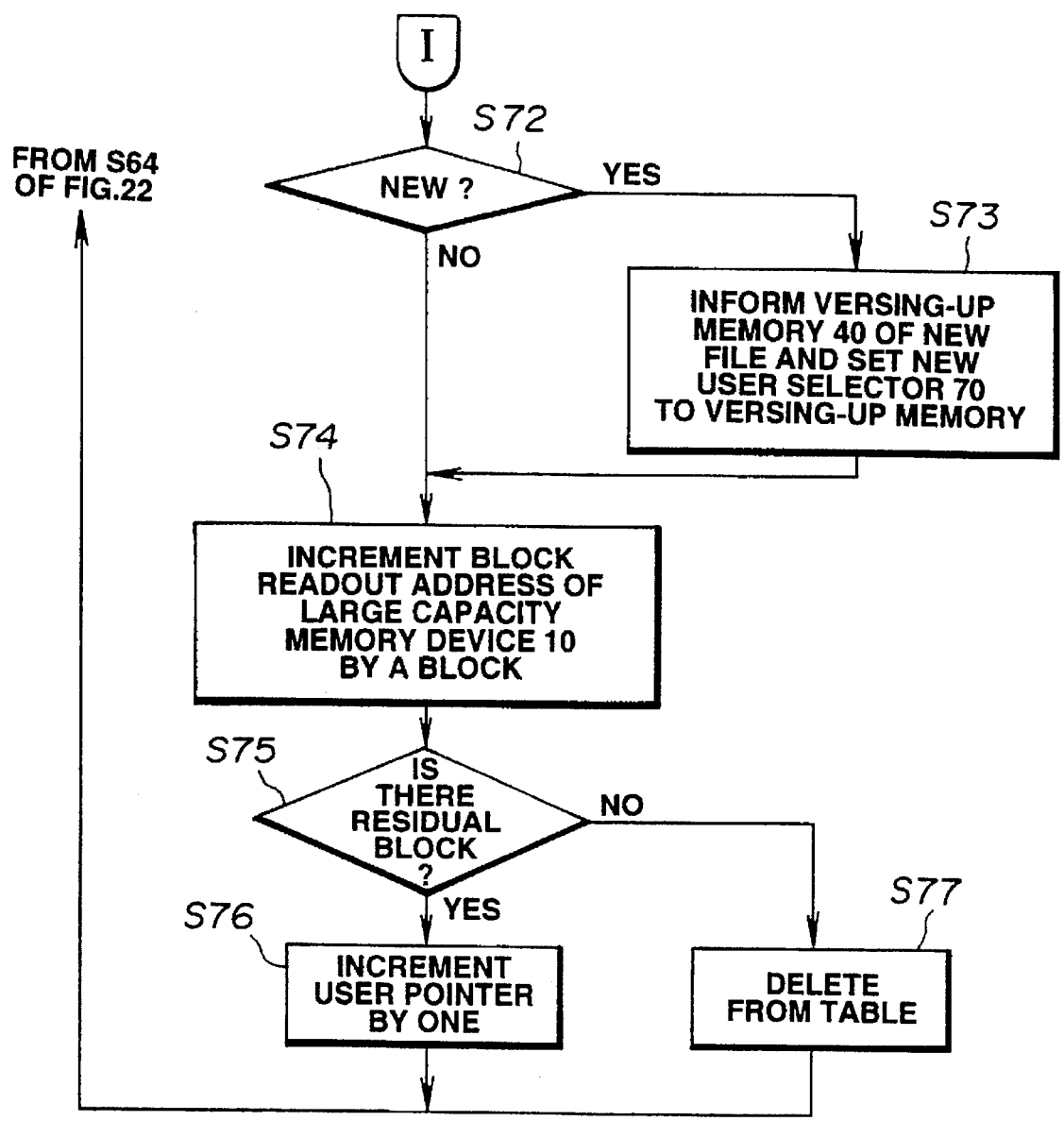
FIG. 23 is another flow chart for illustrating the operation of a memory controller in the information signal transmission device shown in FIG. 4.
Figure 24:
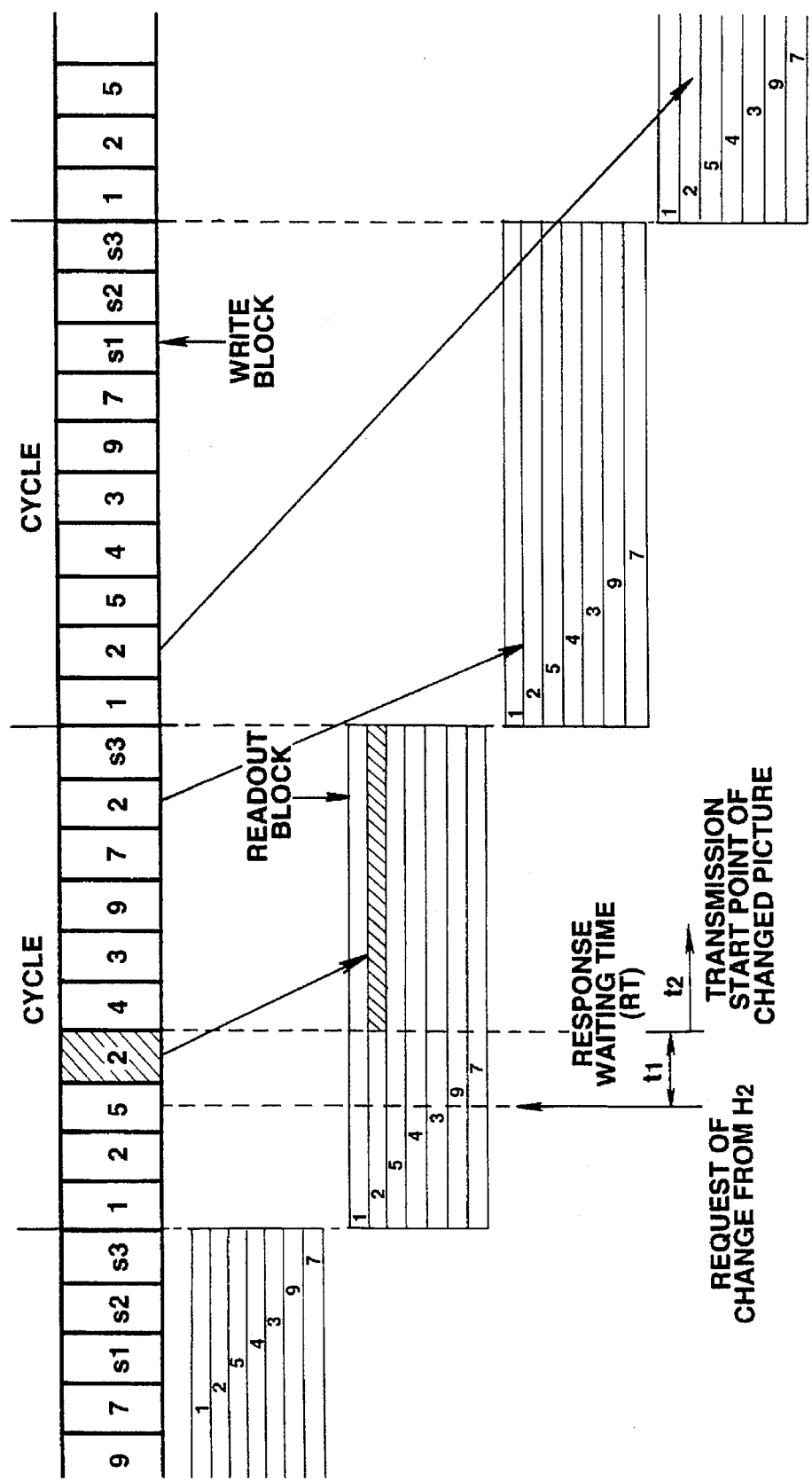
FIG. 24 is a diagrammatic view for illustrating the operation of the information signal transmission device shown in FIG. 4.

FIG. 21 is a flow chart showing the control processing by the device controller 60, while FIGS. 22 and 23 are flow charts showing the control processing by the memory controller FIG. 24 illustrates the operation of the present picture signal transmission device responsive to the request for change of the position of transmission from the requesting party $H_2$.

If a requesting party receiving the transmission service of a file requests picture signals at another position within the file, the transmission position change request is accepted by the device controller 60. In effect, the device controller 60 reads out a request list stating the name of the requesting party, request file etc. at step S41 in FIG. 21. At step S42, the device controller 60 starts communication of the new request read out at step S41.

The device controller 60 then judges at step S43 whether or not the memory controller 50 is ready for acceptance. If the device controller judges that the memory controller 50 is ready for acceptance, the device controller 60 transfers to step S44. If otherwise, the device controller iterates the judgment at step S43 until it judges that the memory controller is ready for acceptance.

At step S44, the device controller 60 judges whether or not there is any new request in the request file read out at step S41. If it is found that a new request has been made, the device controller 60 transfers to step S45. If it is found that a new request has not been made, the device controller 60 transfers to step S51.

At step S45, the device controller 60 judges whether the request found to be present at step S44 is a new request, a transmission position change request (jump request) or a request for abort. If the device controller 60 finds the request to be a new request, it transfers to step S46. If the device controller 60 finds the request to be a jump request, it transfers to step S47, whereas, if it judges the request to be a request for abort, it transfers to step S48.

At step S46, the device controller 60 informs the memory controller 50 of the contents of the new request, that is the requesting party and the file. At step S47, the device controller 60 informs the memory controller 50 of the jump request, that is of the name of the requesting party and the changed transmission position. At step S48, the device controller 60 informs the memory controller 50 of the contents of the request for abort, that is the deletion of the requesting party.

At steps S49 and S50, the device controller 60 judges whether or not there is any other request. That is, the device controller 60 judges whether or not the number n obtained on subtracting unity from the number N of the request list read at step S41 is larger than zero in order to judge whether or not there is any other request. If the number n is judged to be larger than 0, it is judged that there is another request, so that the processing from the step S45 is repeated. If the number n is found not to be larger than 0, it is judged that there is no other request. Thus the device controller 60 transfers to step S51.

At step S51, the device controller 60 is responsive to the results of judgment at steps S44 or S50 to inform the memory controller 50 of the end of the operation for change. At step S52, the device controller judges whether the end is acknowledged by the memory controller 50. If the end is acknowledged by the memory controller 50, the processing from the step S41 is repeated. The end acknowledgement at step S52 is checked repeatedly until the end acknowledgment is received. The processing from the new step S41 is halted during this time.

If the request is informed to the memory controller 50 by the device controller 60 by the above processing, the memory controller 50 performs the processing shown in FIGS. 22 and 23.

At step S61 of FIG. 22, the memory controller 50 awaits the communication from the device controller 60. This processing corresponds to that of step S42 of FIG. 22. The memory controller 50 then communicates to the device controller 60 that it is ready to accept the change. This processing corresponds to step S43 of FIG. 21. At step S63, the memory controller 60 resets the user pointer of the input/output schedule table to the leading end.

The memory controller 50 then judges at step S64 whether or not there is any request for change. If the memory controller 50 judges that a request for change has been made, it transfers to step S65 and, if otherwise, it transfers to step S69.

At step S65, the memory controller 50 judges whether the request for change is a new request, a jump request, a delete request era request for change in playback speed. The request for change in playback speed will be discussed subsequently. If the request is judged to be a new request, the memory controller 50 transfers to step S66 in order to append the new request, for example, the new request concerning the file $T_A$ of the requesting party $H_8$, to the last portion of the input/output schedule table as shown in FIG. 10. If the request is judged to be a jump request or a request for change in playback speed, the memory controller transfers to step S67 in order to effect table change. The table change is to change the address to change the sequence to the earliest readout position or to add the number of a requesting party, if there is no such number in the remaining portion in one cycle, as well as to add the readout of the next block to the last portion of the table. If the request is found to be the request for deletion, the memory controller transfers to step S68 to delete the request corresponding to the request from the input/output table of FIG. 10.

If a requesting party $H_2$ issues at time $t_1$ a request for change, as shown in FIG. 24, the memory controller 50 changes the address based upon the contents of the change request by the requesting party $H_2$ and changes the sequence to the earliest readout position of the large-capacity memory unit 10. If the readout position in the readout sequence of the large-capacity memory unit 10 has lapsed and there is no readout in the course of the cycle, the memory controller changes the address to a new address for addition to the table and adds the readout of the next block.

After the end of the processing at steps S66, S67 or S68, the memory controller 50 transfers to step S69 in order to advise the device controller 60 of the end of table formulation. If there is no name of the requesting party, the memory controller 50 reverts to step S61 via step S70.

At step S71, the memory controller 50 instructs the large-capacity memory unit 10 to read out the block of the requested file based upon the input/output schedule table formulated by the processing by the previous processing up to step S70. At step S71, the memory controller 50 instructs the user memory unit 30 to fetch the block outputted from the large-capacity memory unit 10 via the device interface 20 to the user memory unit 30.

The user memory address controller 33 writes the first block in the memory 31. When the memory 31 has become full, the user memory address controller changes over the writing to the memory 32. In this manner, the user memory address controller 33 changes over the writing from the memory 31 to the memory 32 or vice versa under instructions from the memory controller 50. Such alternate switched writing is continued until depletion of all of the blocks of the file pictures.

If the writing of all of the unit blocks during one cycle shown in FIG. 24 in one of the memories of the user memory unit 30 has come to a close, these memories shift to a readout mode directly before proceeding to the next cycle period. The other memories of the double buffer shift to the write mode. The writing of the respective unit blocks of all of the requesting parties comes to a close during one cycle time shown in FIG. 24. Each block shown in FIG. 24 represents picture data for one cycle time of each requesting party. Each unit block of each requesting party is read out from the memory over one cycle time.

The writing in the block is carried out for each requesting party in the sequence shown in the table.

If the requesting party $H_2$ should make a jump request during writing of the requesting party $H_5$, the table is updated, such that the sequence of the requesting parties becomes $H_1$, $H_2$, $H_5$, $H_2$, $H_4$, $H_3$, $H_9$, $H_7$ and $H_2$. If a change request is made by the requesting party $H_2$, the block of the requesting party $H_2$ is written after the writing of the block of the requesting party $H_5$, and readout is started as soon as the writing comes to a close. Thus, even in the worst case, the waiting time since the change request until transmission of the changed picture is the sum of two readout blocks, that is one second.

If a new request is made, the memory controller 50 instructs the versing-up memory unit 40 to make the versing-up, that is to find the leading end of the requested file, at the same time as it instructs the selection unit 70 to select the picture header data on the side versing-up memory unit 40. The writing of the block of the information signals of the leading file ends of the respective files in the versing-up memory unit 40 is previously commanded by the device controller 60 to the memory controller 50. When the initial writing from the large-capacity memory unit 10 to the memory 31 come to a close and readout is started, the memory controller sets the selection of the selection unit 70 to the side user memory controller 30.

Thus the memory controller 50 judges at step S72 whether or not the instructions issued at step S71 is a new request concerning the file of a new requesting party. If it is a new request, the memory controller transfers to step S73 to inform the versing-up memory unit 40 of the new file. The memory controller 50 then changes over the selector in the selection unit 70 to the side versing-up memory 40.

If the memory controller 50 judges that the request is not a new request, it transfers to step S74 in order to increment the block readout address by one block. At step S75, the memory controller checks if there is or there is not any residual block. If there is any residual block, the memory controller transfers to step S76 to increment the user pointer by one. If there is no residual block, the memory controller transfers to step S77 to delete the change request from the table.

After the processing at step S76 or S77 comes to a close, the memory controller reverts to step S64 of FIG. 22.

The information signal transmission device of the present invention has the large-capacity memory unit for storing information signals of plural files, input/output means having an input/output buffer memory for inputting or outputting information signals stored in the large-capacity memory unit, and control means for controlling the writing and readout of the information signals of the input/output means. When changing the readout sequence of the input/output means on occurrence of a change request, the control means changes the write/read sequence of the input/output means so as to read out data for the requesting party requesting the change from the input/output buffer memory directly after the unit block of the information signals outputted from the large-capacity memory unit 10. Consequently, the picture of the requested file may be transmitted instantaneously even in cases wherein the request is for transmission from another position of the file being transmitted or transmission from a mid position of a new file.

Figure 25:
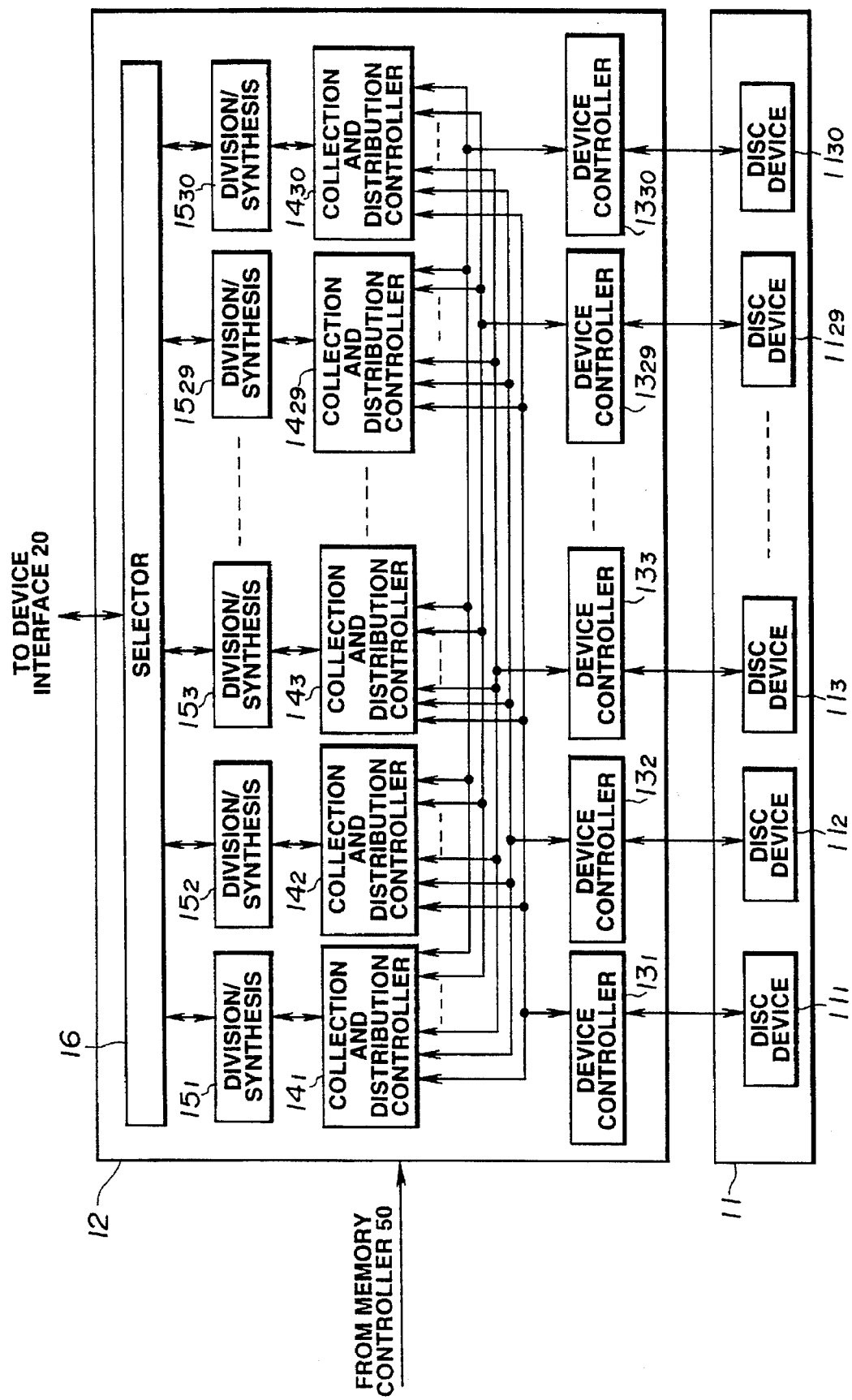
FIG. 25 is a block diagram showing an embodiment of a large-capacity memory unit in the information signal transmission device shown in FIG. 4.

The construction of the large-capacity memory unit 10 is explained by referring to FIG. 25.

The large-capacity memory unit 10 comprises a disc array 11 made up of disc devices $11_1$, $11_2$, $11_3$ ... $11_{29}$, $11_{30}$, and a disc array controller 12 for controlling the disc array 11, as shown in FIG. 25. The disc array 11 stores input picture data distributed and interleaved under control by the disc array controller 12. It is possible with the disc array 11 to effect recording/reproduction in parallel on plural disc devices and hence to improve the storage capacity and transfer speed and to achieve reliability higher than in the case of a single disc device.

Assuming that there are plural input units of picture signals termed files or titles, the disc array 11 distributes and stores the file pictures in the disc devices $11_1$, $11_2$, $11_3$ ... $11_{29}$, $11_{30}$. The respective file pictures are transmitted to the requesting parties by the disc array controller 12 reading out portions (blocks) of the plural file pictures from the disc array 11 per unit time responsive to the command from the memory controller 50.

The disc array controller 12 comprises device controllers $13_1$, $13_2$, $13_3$ ... $13_{29}$, $13_{30}$, collection/distribution controllers $14_1$, $14_2$, $14_3$ ... $14_{29}$, $14_{30}$, for collecting and distributing picture signals to and from the disc devices $11_1$, $11_2$, $11_3$ ... $11_{29}$, $11_{30}$ via the device controllers $13_1$, $13_2$, $13_3$ ... $13_{29}$, $13_{30}$, divider/synthesizers $15_1$, $15_2$, $15_3$ ... $15_{29}$, $15_{30}$ associated with the collection/distribution controllers $14_1$, $14_2$, $14_3$ ... $14_{29}$, $14_{30}$, and a selector 16 provided between the divider/synthesizers $15_1$, $15_2$, $15_3$ ... $15_{29}$, $15_{30}$ and the device interface 20 for changing over and selecting the picture signals.

The device controllers $13_1$, $13_2$, $13_3$ ... $13_{29}$, $13_{30}$ control input/output of the disc devices $11_1$, $11_2$, $11_3$ ... $11_{29}$, $11_{30}$ in accordance with the request made by the memory control unit 50.

The collection/distribution controllers $14_1$, $14_2$, $14_3$ ... $14_{29}$, $14_{30}$ collect and distribute the picture signals of the respective files to and from the disc devices $11_1$, $11_2$, $11_3$ ... $11_{29}$, $11_{30}$. The collection/distribution controllers $14_1$, $14_2$, $14_3$ ... $14_{29}$, $14_{30}$ are connected over data lines to all of the disc devices $11_1$, $11_2$, $11_3$ ... $11_{29}$, $11_{30}$ for selecting the required one of the data lines based upon a data selection signal from the memory controller and for collecting and distributing picture signals. In addition, the input picture signals via the device interface 20 are divided and sent to the disc devices $11_1$, $11_2$, $11_3$ ... $11_{29}$, $11_{30}$.

The divider/synthesizers $15_1$, $15_2$, $15_3$ ... $15_{29}$, $15_{30}$ take charge of division/synthesis of picture signals and interpolate deficit picture signals in case the disc devices making up the disc array 11 is unable to reproduce picture signals due for example to defects produced as a result of the request for picture signal transmission for a requesting party exceeding the playback capability of the disc devices. The picture signal division/synthesis is performed using the picture signals of all of the disc devices $11_1$, $11_2$, $11_3$ ... $11_{29}$, $11_{30}$, or using data of only one of a plurality of the disc devices, case by case, and depending on the playback speed. In case of normal reproduction, frame data is collected from the totality of 30 disc devices for synthesizing continuous data for normal reproduction. In case of double-speed reproduction, every other disc device is selected from the 30 disc devices for synthesizing continuous data for double rate reproduction. By the double rate herein is not meant that the readout rate is doubled, but that the readout frequency in case of reading a constant-volume data complying with the requests by plural requesting parties per unit time is doubled for the requesting party requesting the double-rate reproduction as compared to that of a requesting party requesting normal speed reproduction. For example, with 30-tuple speed reproduction, picture signals are read out at a frequency 30 times that for normal speed reproduction. Thus the divider/synthesizers $15_1$, $15_2$, $15_3$ ... $15_{29}$, $15_{30}$ is responsive to the playback speed requested by the requesting party to select and synthesize data flexibly at the collection/distribution controllers $14_1$, $14_2$, $14_3$ ... $14_{29}$, $14_{30}$ in order to improve the readout frequency of the picture signals.

Figure 26:
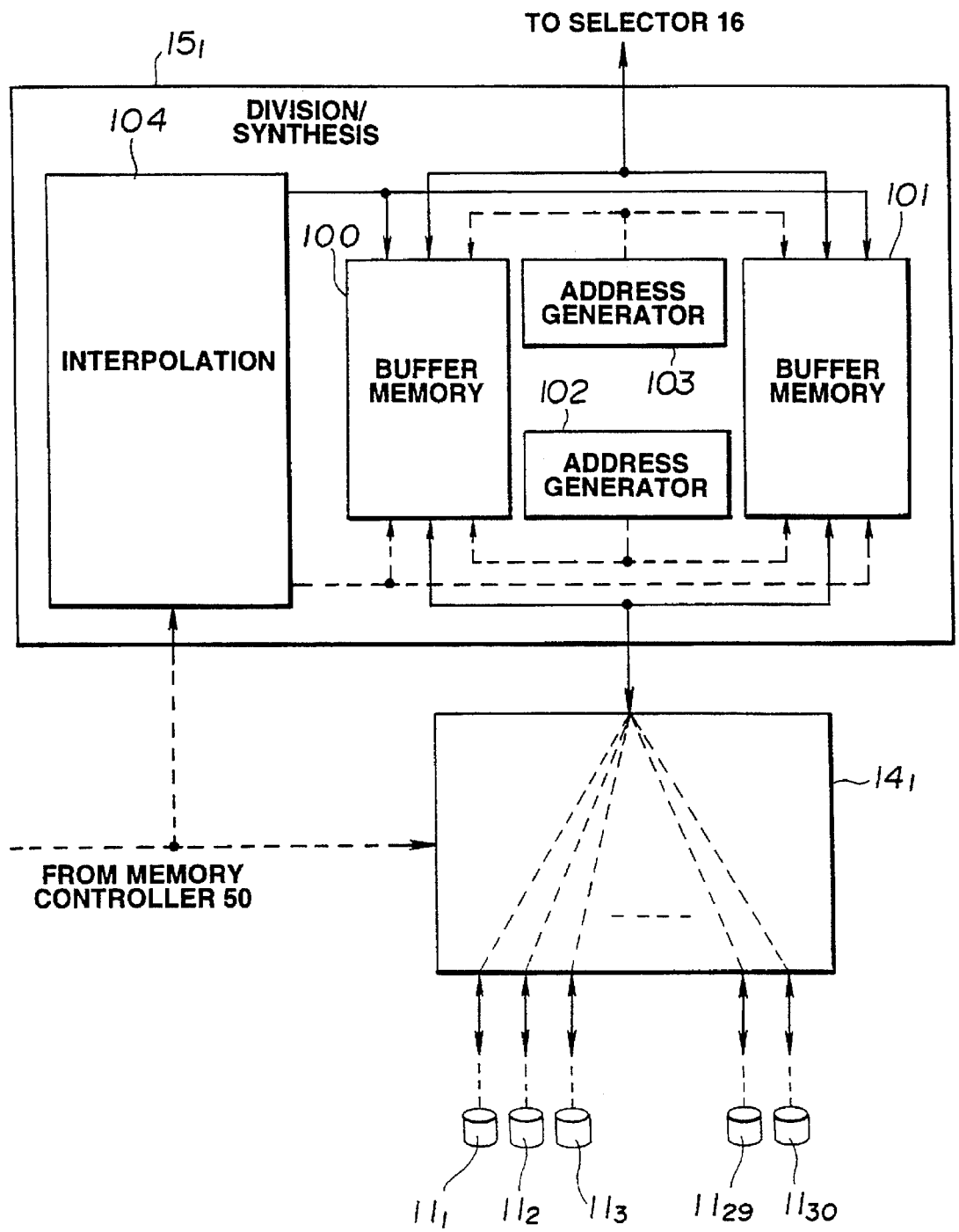
FIG. 26 is a block diagram showing an embodiment of a division-synthesis portion in the large-capacity memory unit in the information signal transmission device shown in FIG. 4.

One $15_1$, for example, of the divider/synthesizers $15_1$, $15_2$, $15_3$ ... $15_{29}$, $15_{30}$ is made up of buffer memories 100, 101, address generators 102, 103 and an interpolator 104, as shown in FIG. 26.

The two buffer memories 100, 101 make up a double buffer memory.

The two address generators 102, 103 respectively generate an input/output address of the data collecting/distributing controller $14_1$ and an input/output address of the selector 16. The interpolator 104 interpolates a deficit data by forward and backward frames. Thus the interpolator 104 routes the address to the buffer memories 100, 101 in order to read out the forward and backward frame data and routes the resulting interpolation data to the buffer memories 100 and 101. The interpolator 104 is fed from the memory controller 50 with the timing signal, address generation control signal, buffer memory control signal and with the interpolation control signal.

The interpolation by the interpolator 104 compensates any defective portion that is produced when the picture signal transmission request by the requesting party exceeds the playback capability of the disc devices making up the disc array 11. In case of a high-speed playback, access is concentrated in a given disc device. In the case of a 30-tuple speed reproduction, for example, picture signals are read out from a disc device at a frequency of 30 times that for normal reproduction, that is at a rate of 30 frames per second. Since the requests for playback are also made by other requesting parties, the readout from the disc device exceeds the maximum transfer rate which represents the limit of performance of the disc device, so that the picture signals cannot be purveyed to the requesting party. The interpolator 104 plays the role of preventing the occurrence of such circumstances. The interpolator 104 interpolates any deficient frame from the temporally forward and backward frames. The interpolation may be performed on the field basis instead of on the frame basis as in the present embodiment. Such interpolation is effective for picture signal having strong correlation between the frames or fields. If the picture signals are compressed pictures and cannot be directly interpolated, it is also possible for the interpolator 104 to expand the compressed data once for interpolation and to send out the generated picture after compression.

Such interpolation may also be employed not only for making up deficit data caused by access concentration but also for correction or concealment of so-called error data by generating data for the disc device by interpolation by the data for an other disc device.

The selector 16 selects the outputs of the divider/synthesizers $15_1$, $15_2$, $15_3$ ... $15_{29}$, $15_{30}$ or distributes data via the device interface 20 to the divider/synthesizers $15_1$, $15_2$, $15_3$ ... $15_{29}$, $15_{30}$.

The user memory unit 30 is an input/output buffer memory for data rate conversion for adjusting the input/output transfer speed in order to supply the picture signals purveyed by the large-capacity memory unit 10 via the device interface 20 as described previously. The transfer speed of the picture signals supplied from the large-capacity memory unit 10 via the device interface 20 is high since plural files are accessed per unit time. Conversely, the transfer speed of the picture signals supplied to the requesting party is slow so that the user memory unit 30 as an input/output buffer is required for adjusting the transfer speed.

Next, for the case in which there is made a request for change in the playback speed, the control operations and picture signal flow since the request for a file by a requesting party until transmission of the corresponding picture signal will now be explained by referring to FIGS. 27, 22 and 23.

Figure 27:
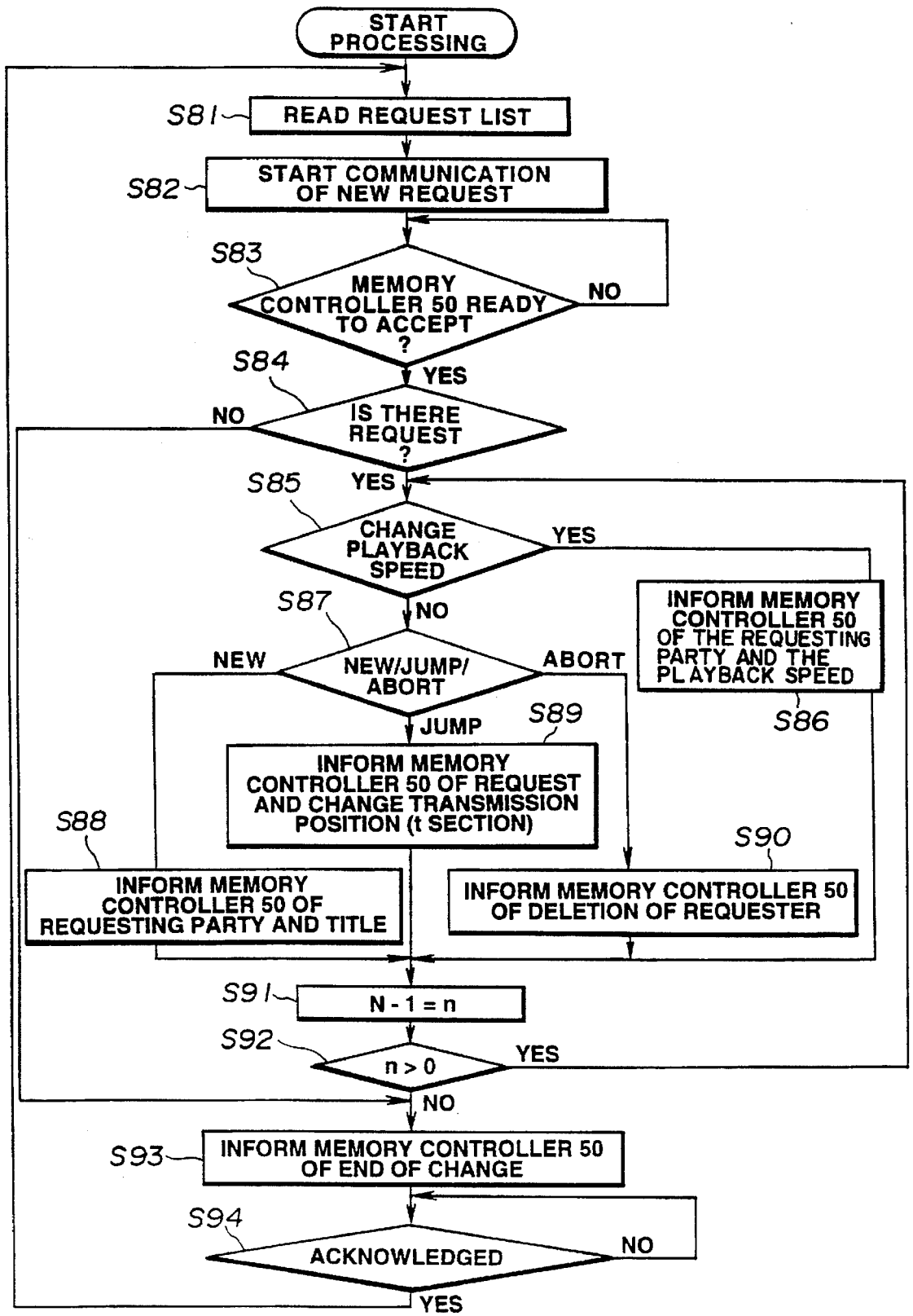
FIG. 27 is a flow chart for illustrating the operation of the device controller in the information signal transmission device shown in FIG. 4.

FIG. 27 is a flow chart for illustrating the control operations for the device controller 60, and FIGS. 22 and 23 are flow charts for illustrating the operation of the memory controller 50. The explanation of FIGS. 22 and 23 has been made previously.

At step S81 of FIG. 27, the device controller 60 reads out a request file stating the name of the requesting party and the file, and starts at step S81 to communicate the new request read at step S81.

At step S83, the device controller 60 judges whether or not the memory controller 50 is ready for acceptance. If the device controller judges that the memory controller 50 is ready for acceptance, the device controller 60 transfers to step S84. If the device controller judges that the memory controller is not ready for acceptance, the device controller repeats the judgment operation of step S83 until the memory controller is found to be ready for acceptance.

At step S84, the device controller 60 judges whether or not there is any new request, that is a change request, in the request list read at step S81. If the device controller judges that there is a new request, it transfers to step S85 and, if otherwise, it transfers to step S93.

At step S85, the device controller 60 judges whether or not the request found to be a new request at step S84 is the playback speed change request. If the device controller judges the request to be the playback speed change request, it transfers to step S86 and, if otherwise, it transfers to step S87.

At step S86, the device controller 60 informs the memory controller 50 of the requesting party and the playback speed.

At step S87, the device controller 60 judges whether the request judged to be a new request at step S84 is a new request, a jump request or a request for abort. If the device controller 60 judges the request to be a new request, a jump request or a request for abort, the device controller transfers to step S88, step S89 and to step S90, respectively.

At step S88, the device controller 60 informs the memory controller 50 of the contents of the new request, that is the requesting party and the file. At step S89, the device controller 60 informs the memory controller 50 of the contents of the jump request, that is the requesting party and the changed transmission position. At step S90, the device controller 60 informs the memory controller 50 of the contents of the request for abort, that is deletion of the requesting party.

The device controller 60 then judges whether or not there is any other request. That is, the device controller 60 judges whether or not the number n equal to the number N of the request lists read at step S81 less unity is larger than zero in order to judge whether or not there is any other request. If n is found to be larger than zero, there is an other request, so that the processing from the step S85 is repeated. If n is found to be not larger than zero, there is no other request, so that the device controller 60 proceeds to step S93.

At step S93, the device controller 60 informs the memory controller 50 of the end of the processing for change responsive to the results of judgment at the steps S84 and S92, and advises the memory controller 50 at step S94 whether or not acknowledgement from the memory controller 50 has been made. If there is acknowledgement for end from the memory controller 50, the process from step S81 is repeated. The judgment as to the acknowledgement from step S94 is repeatedly made until acknowledgement for end is issued. The process from the step S81 is discontinued for the time being.

If the memory controller 50 is informed by the device controller 60 of the request by the above processing, the memory controller 50 performs the processing previously explained in connection with FIGS. 22 and 23.

As described above, the picture signal transmission device of the present embodiment performs the operations conforming to the new request, jump request, playback speed change request and request for abort from the requesting party under control by the device controller 60 and the memory controller 50.

The picture signal recording operation and the playback operation responsive to the playback speed change request will be explained by referring to FIGS. 4, 20, 25 and 26.

First, the recording operation is explained.

The large-capacity memory unit 10 writes the picture signals supplied from the device interface 20 via the selector 16 in the buffer memory 100 in accordance with the addresses generated in the address generator 103. If a pre-set data volume, such as 30 frames, is stored in the buffer memory 100, the picture signals supplied from the device interface 20 are similarly written in the buffer memory 101. The picture signals are read out from the buffer memory 100 in accordance with the readout address generated in the address generator 102. The write/read operation by the two buffer memories 100, 101 is repeated alternately. In case of such data recording, the address generators 102, 103 generate the readout addresses and the write addresses, respectively. The writing is carried out in the frame or field sequence and readout is carried out in the sequence of corresponding pixels of 30 frames. The collection/distribution controllers $14_1$, $14_2$, $14_3$ ... $14_{29}$, $14_{30}$ fetch 30 pixels from the 30 frames and distribute the pixels among 30 disc devices $11_1$, $11_2$, $11_3$ ... $11_{29}$, $11_{30}$ to complete the recording operation.

The playback operation is now explained.

The operation for the requests for normal reproduction, double-speed reproduction, triple-speed reproduction and 30-tuple speed reproduction will be explained.

Figure 28:
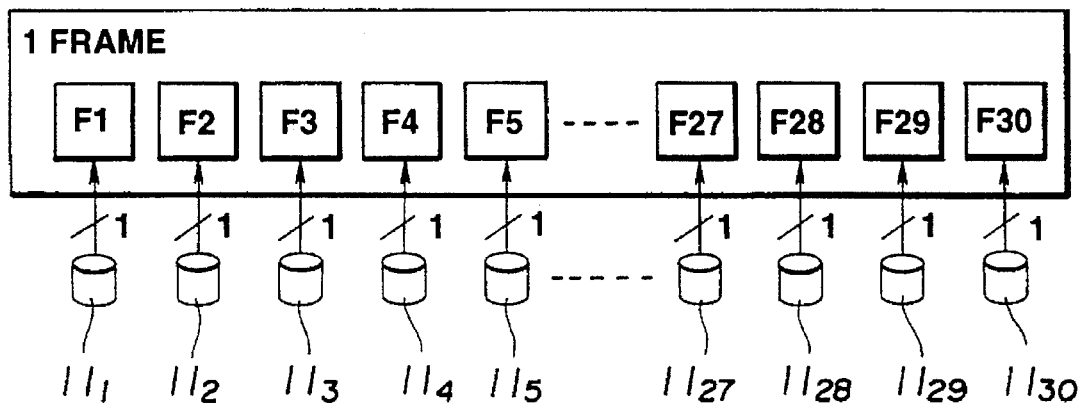
FIG. 28 is a diagrammatic view for illustrating the operation during the normal reproduction of the information signal transmission device shown in FIG. 4.

If the playback speed requested by the requesting party by the device controller 60 is the normal speed, the picture signals from the 30 disc devices $11_1$, $11_2$, $11_3$ ... $11_{29}$, $11_{30}$ are fetched by the collection/distribution controllers $14_1$, $14_2$, $14_3$ ... $14_{29}$, $14_{30}$, by 30 pixels at a time, so as to be written in the buffer memories of the divider/synthesizers $15_1$, $15_2$, $15_3$ ... $15_{29}$, $15_{30}$. The pixel from the divider/synthesizer $15_1$, for example, is written in the buffer memory 100. By such writing, 30-frame pictures are re-constructed in accordance with the addresses from the address generator 102. On completion of the 30-frame picture, writing is made in the buffer memory 101, while readout is made from the buffer memory 100. The writing/readout operation to and from the buffer memories 100, 101 is repeated alternately. For such data reproduction, the address generators 102, 103 generate write addresses and readout addresses, respectively. If, during picture construction, deficit data is produced by some reason or other, the interpolator 104 reads out the frames before and after the deficit data to interpolate the deficit data to produce interpolated data which is then returned to the buffer memories 100, 101. The memory controller transmits the timing signal, address generating and controlling signals, buffer memory controlling signal and the interpolation controlling signal to the interpolator 104 by way of performing interpolating control operations for the divider/synthesizer $15_1$. Thus, for normal speed reproduction, the buffer memories 100, 101 read out frame data F1, F2, F3, F4, F5, ... F27, F28, F29 and F30 by equal quantities to generate continuous data at frames/second as shown in FIG. 28. In FIG. 28, "1" between each disc device and the buffer memory indicates the normalized transfer speed for the normal transfer speed set to unity.

Figure 29:
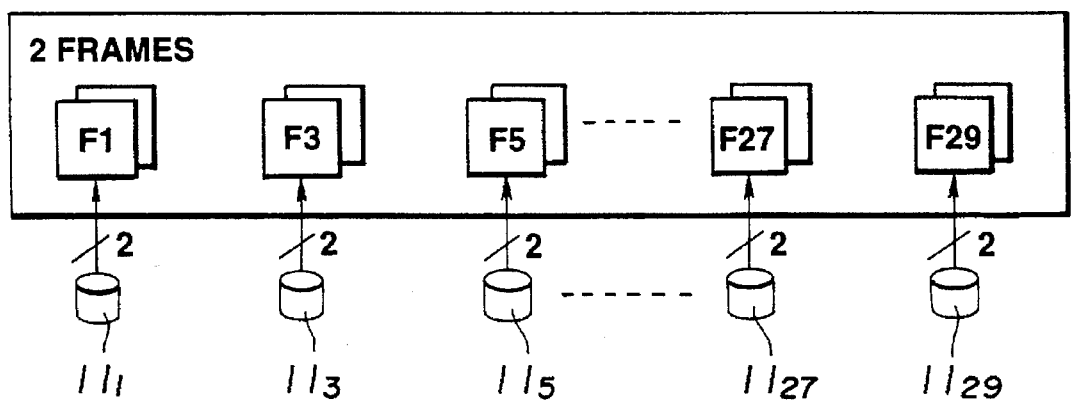
FIG. 29 is a diagrammatic view for illustrating the operation of the double-speed reproduction of the information signal transmission device shown in FIG. 4.
Figure 30:
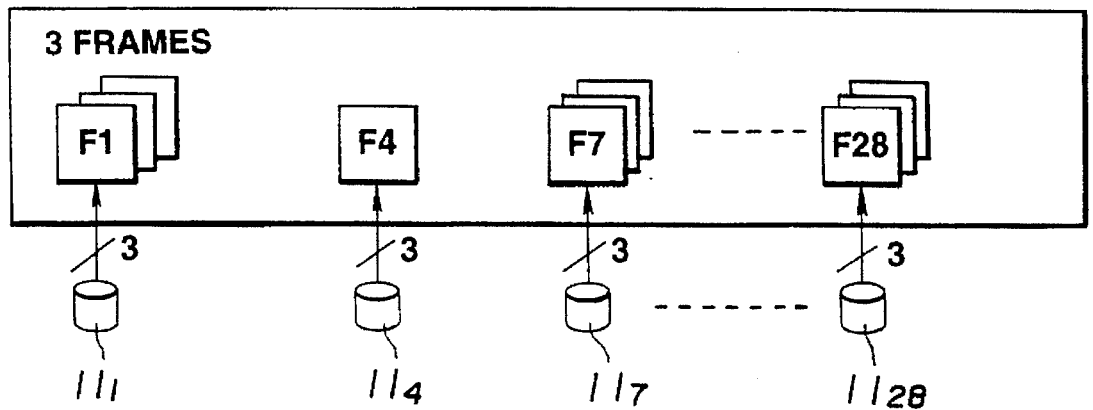
FIG. 30 is a diagrammatic view for illustrating the operation of the triple-speed reproduction of the information signal transmission device shown in FIG. 4.
Figure 31:
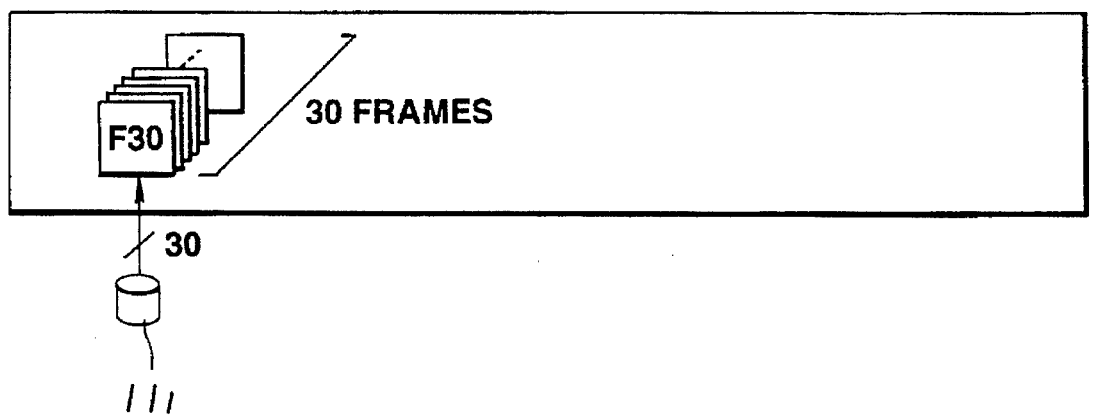
FIG. 31 is a diagrammatic view for illustrating the operation of the 30-tuple speed reproduction of the information signal transmission device shown in FIG. 4.
Figure 32:
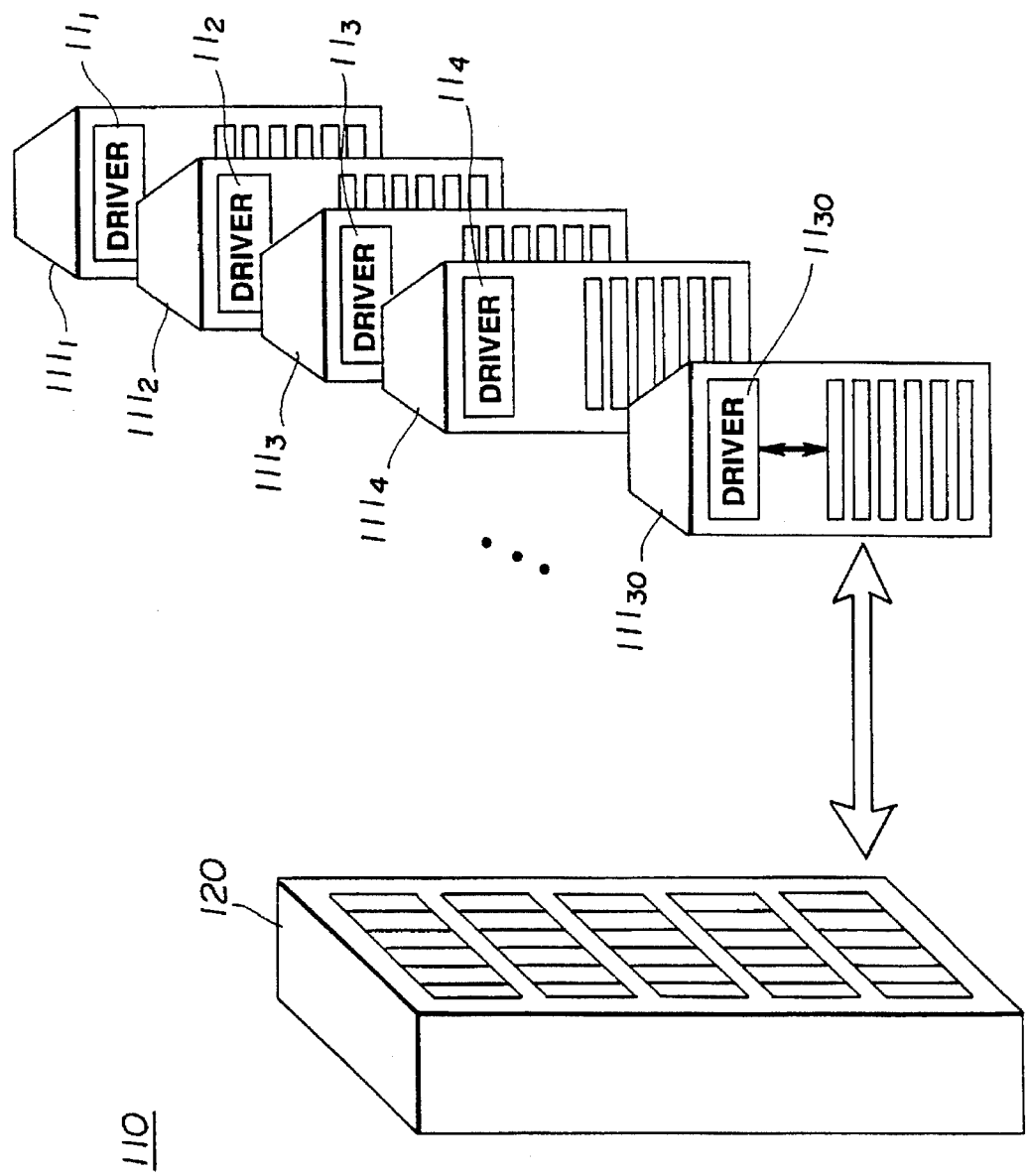
FIG. 32 shows an embodiment of an auto-changer in the large-capacity memory device in the information signal transmission device shown in FIG. 4.

The operation for the double-speed playback speed as requested to the device controller 60 by the requesting party is explained by referring to FIG. 29.

When the request for double-speed reproduction is made to the device controller 60, the disc array 11 reads out frame data twice in volume that for normal reproduction from every other disc device, that is from 15 of the disc devices $11_1$, $11_3$, $11_5$, ... $11_{27}$, $11_{29}$, for generating continuous data at a rate of 30 frames/second.

If the request made to the device controller 60 is that for triple speed reproduction, the disc array 11 reads out frame data thrice in volume that for normal reproduction from every two disc devices, that is from 10 of the disc devices $11_1$, $11_4$, $11_7$, ... $11_{28}$, for generating continuous data at a rate of 30 frames/second.

If the request made to the device controller 60 is that for 30-tuple speed reproduction, the disc array 11 reads out frame data 30 times in volume that for normal reproduction from every 29 disc devices, that is only from disc devices $11_1$, for generating continuous data at a rate of 30 frames/second.

In general, for n-tuple speed reproduction, every (n−1) disc devices are employed. By the expression "for every (n−1) disc devices" are meant sequentially n'th disc devices as counted from an optional disc device.

It may occur in effect that accessing be concentrated on the disc devices $11_1$, $11_2$, $11_3$ ... $11_{29}$, $11_{30}$. The practical operation of the present embodiment in such case is hereinafter explained.

It is now assumed that there are 30 users of the present picture signal transmission device, the transfer rate of each file picture is 30 Mbps and the maximum transfer rate of each disc device is 40 Mbps.

If one user requests the 30-tuple speed reproduction and the remaining 29 users request normal speed reproduction, the data transfer rate required in the present embodiment is $$29 \times 1 \; Mbps + 1 \; \text{(for 30-tuple speed reproduction)} \times 30 \; Mbps = 59 \; Mbps$$

such that data for 10 requesting parties or 19 Mbps are in shortage. This the divider/synthesizer generates the deficit data of 19 Mbps by interpolation.

If two users request the 15-tuple speed reproduction and the remaining 28 users request normal speed reproduction, the data transfer rate required in the present embodiment is $$28 \times 1 \; Mbps + 1 \; \text{(for 15-tuple speed reproduction)} \times 15 \; Mbps = 43 \; Mbps$$

such that data for 3 requesting parties or 3 Mbps are in shortage. This the divider/synthesizer generates the deficit data of 3 Mbps by interpolation.

If 12 users request the triple speed reproduction and the remaining 18 users request normal speed reproduction, the data transfer rate required in the present embodiment is $$18 \times 1 \; Mbps + 4 \; \text{(for triple speed reproduction)} \times 3 \; Mbps = 30 \; Mbps$$

which is less than 40 Mbps and hence interpolation is unnecessary.

If 1 user requests 30-tuple speed reproduction, the data transfer speed required by the present embodiment is $$1 \; \text{(for 30-tuple speed reproduction)} \times 30 \; Mbps = 30 \; Mbps$$

which is less than 40 Mbps and hence interpolation is unnecessary.

Thus it is possible with the present picture signal transmission device to reproduce picture signals as continuous pictures of 30 frames per second at intervals of n frames even if the requesting party should make a request for change in playback speed, as for example for n-tuple speed reproduction.

The information signal transmission device according to the present invention is not limited to the above embodiments and may be adapted for 30 or more of the disc devices. The present invention may be applied not only to the picture signal transmission devices for transmitting picture signals but also to audio signal transmitting device or to a letter information transmitting device. The transmission rate is 15 frames per second and 10 frames per second for the playback speed of 60-tuple speed or 90-tuple speed reproduction, respectively.

With the large-capacity memory unit according to the present invention, since changeover selection means are provided in the plural collection/distribution control means connected to all of plural small-scale memory means adapted for storing information signals, and the playback data from the small-scale memory means as required depending on the requested playback speed are collected and distributed so as to be supplied to the changeover selection means, plural requests for special reproduction modes can be coped with and the playback speed can be changed easily.

On the other hand, since the information signal transmission device according to the present invention comprises a large capacity memory device, input/output means having an input/output buffer memory for inputting/outputting information signals of the large-capacity memory device and control means for controlling the writing of information signals from the large-capacity memory device to the input/output means, the playback speed can be changed easily and special reproduction exemplified by double-speed reproduction can be achieved easily.

If a large number of discs as recording media are handled in the large-capacity memory unit 10, disc exchange may be made automatically by providing disc changers $111_1$, $111_2$, $111_3$ ... $111_{29}$, $111_{30}$ for the disc devices $11_1$, $11_2$, $11_3$ ... $11_{29}$, $11_{30}$ and a main disc changer 120 for supplying desired discs to these disc changers, thereby enabling automatic disc exchange operations.

Figure 33:
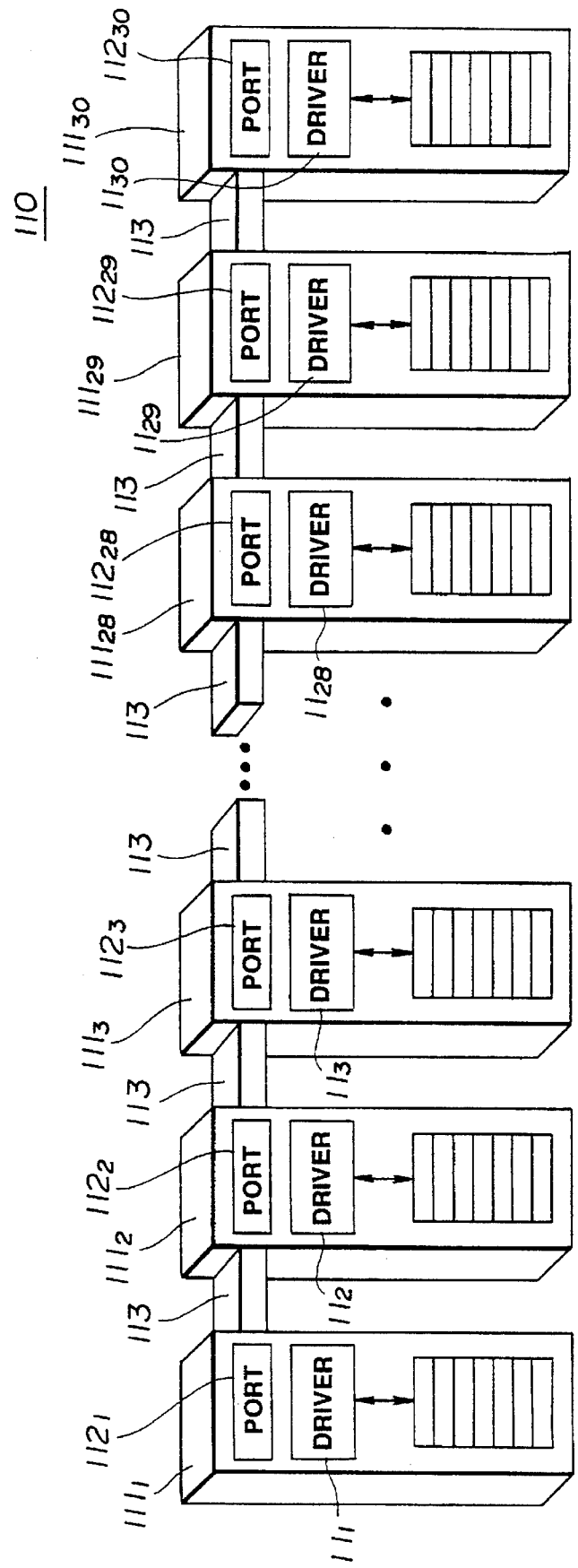
FIG. 33 shows another embodiment of an auto-changer in the large-capacity memory device in the information signal transmission device shown in FIG. 4.

The disc changers may also be so arranged that ports $112_1$, $112_2$, $112_3$ ... $112_{29}$, $112_{30}$ thereof are connected to connection means 113 to permit disc exchange between respective disc changers, as shown in FIG. 33.

What is claimed is:

1. A signal distribution apparatus for distributing a plurality of information signals to a plurality of requesting parties, wherein each of said plurality of information signals includes a leading-end signal and a plurality of portions, said apparatus comprising:

storage means for storing said plurality of information signals;

leading-end memory means, coupled to said storage means, for storing a plurality of leading-end signals;

buffer memory means, coupled to said storage means, for storing at least one portion of an information signal;

selector means, coupled to said leading-end memory means and to said buffer memory means, for selecting between said leading-end memory means and said buffer memory means for supply of a signal to a requesting party; and controller means, coupled to said storage means, to said leading-end memory means, to said buffer memory means, and to said selector means and responsive to a request from said requesting party, for controlling said leading-end memory means and said selector means to supply at least one of said plurality of leading-end signals to said requesting party and for controlling said storage means to supply thereafter said plurality of portions of the corresponding information signal from said storage means via said buffer memory means.

2. Apparatus according to claim 1, wherein said controller means further controls said storage means to receive said information signal and to supply a corresponding leading-end signal to said leading-end memory means.

3. Apparatus according to claim 1, wherein said controller means controls said buffer means and said selector means to supply at least one portion of an information signal to said requesting party.

4. Apparatus according to claim 3, wherein said controller means further controls said storage means to supply a second portion of an information signal to said buffer memory means.

5. Apparatus according to claim 3, wherein said controller means further controls said storage means to supply a second portion of an information signal to said buffer memory means in response to a change request from said requesting party.

6. Apparatus according to claim 1, wherein said storage means comprises a plurality of disc storage media.

7. Apparatus according to claim 6, wherein said storage means supplies a subset of a plurality of portions of said information signal to said buffer memory means at a constant frame rate.

8. Apparatus according to claim 6, wherein said storage means multiplexes a plurality of portions of said plurality of information signals and supplies the multiplexed plurality of portions to said buffer memory means.

9. Apparatus according to claim 1, wherein said leading-end memory means comprises a plurality of memory devices.

10. Apparatus according to claim 1, wherein said buffer memory means comprises a plurality of memory devices.

11. Apparatus according to claim 1, wherein said selector means comprises a plurality of selector devices.

12. Apparatus according to claim 1, wherein said plurality of information signals comprise a plurality of video signals.

13. Apparatus according to claim 12, wherein said plurality of portions comprise a plurality of blocks.

14. An information signal transmission device for transmitting information signals to plural requesting parties responsive to their requests, comprising:

storage means having information signals stored therein;

versing-up memory means for storing signals of a leading end of information signals stored in said storage means;

a plurality of buffer memory means for storing information signals for the requesting parties read out time-divisionally from said storage means on the block basis, said information signals when read out from said buffer memory means being expanded along the time axis;

changeover means fed with an output signal of said buffer memory means and an output signal of said versing-up memory means for transmitting an output signal of said buffer memory means to an associated requesting party after transmitting the output signal of said versing-up memory means to the associated requesting party; and control means for controlling said storage means, buffer memory means and said versing-up memory means so that said information signals are transferred from said storage means to said buffer memory means responsive to a request from said requesting party at the timing conforming to the requests made by said requesting party and so that signals of said leading portions are outputted by said versing-up memory means at the timing conforming to the request made by the requesting party;

wherein said storage means has plural disc recording/reproducing devices;

wherein said information signals are stored by being distributed among said disc reproducing devices at pre-set units; and wherein said storage means generate n-tuple speed information signals from signals reproduced from every (n−1) disc recording/reproducing devices when a request for n-tuple speed playback request is made by one of the plural requesting parties.

15. An information signal transmission device for transmitting information signals to plural requesting parties responsive to their requests, comprising:

storage means having plural types of the information signals stored therein;

versing-up memory means for storing signals of leading ends of the information signals stored in said storage means;

a plurality of buffer memory means for storing information signals for the requesting parties read out time-divisionally from said storage means on the block basis, said information signals when read out from said buffer memory means being expanded along the time axis;

changeover means fed with an output signal of said buffer memory means and an output signal of said versing-up memory means for transmitting the output signal of said buffer memory means to associated requesting parties after transmitting the output signal of said versing-up memory means to the associated requesting parties; and control means for controlling said storage means, buffer memory means and said versing-up memory means so that said information signals of the types conforming to said requests are transferred from said storage means to said buffer memory means responsive to requests from said requesting parties at the timing conforming to the requests made by said requesting parties and so that signals of said leading portions of the types conforming to said requests are outputted by said versing-up memory means at the timing conforming to the requests made by the requesting parties;

wherein said storage means has plural disc recording/reproducing devices;

wherein said information signals are stored by being distributed among said disc reproducing devices at pre-set units; and wherein said storage means generate n-tuple speed information signals from signals reproduced from every (n−1) disc recording/reproducing devices when a request for n-tuple speed playback request is made by one of the plural requesting parties.

* * * * *